US010963728B2

(12) United States Patent
Morozov et al.

(10) Patent No.: US 10,963,728 B2
(45) Date of Patent: Mar. 30, 2021

(54) METHOD, DEVICE, AND SYSTEM FOR PROCESSING MULTIMEDIA SIGNAL

(71) Applicant: Samsung Electronics Co., Ltd, Gyeonggi-do (KR)

(72) Inventors: Konstantin Morozov, Kiev (UA); Andrii Volochniuk, Kiev (UA); Jung-kee Lee, Osan-si (KR); Oleksandr Shchur, Kiyv (UA); Sun-kyung Kim, Busan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 37 days.

(21) Appl. No.: 15/854,568

(22) Filed: Dec. 26, 2017

(65) Prior Publication Data

US 2018/0181829 A1 Jun. 28, 2018

(30) Foreign Application Priority Data

Dec. 26, 2016 (KR) ........................ 10-2016-0179310

(51) Int. Cl.

*G06K 9/46* (2006.01)
*G06N 3/08* (2006.01)
*G06T 7/73* (2017.01)
*G06K 9/64* (2006.01)
*G06N 3/04* (2006.01)
*G06T 5/20* (2006.01)

(52) U.S. Cl.

CPC ......... *G06K 9/4628* (2013.01); *G06K 9/4642* (2013.01); *G06K 9/64* (2013.01); *G06N 3/0454* (2013.01); *G06N 3/08* (2013.01); *G06T 5/20* (2013.01); *G06T 7/73* (2017.01); *G06T 2207/10016* (2013.01); *G06T 2207/20021* (2013.01); *G06T 2207/20081* (2013.01); *G06T 2207/20084* (2013.01)

(58) Field of Classification Search

None

See application file for complete search history.

(56) References Cited

U.S. PATENT DOCUMENTS 9,307,949 B2 4/2016 Tsubota et al.
10,089,556 B1 * 10/2018 Xu ..................... G06K 9/00771
2014/0050415 A1 2/2014 Sims
2014/0099033 A1 4/2014 Natarajan et al.
2014/0112596 A1 4/2014 Yang
2015/0133191 A1 5/2015 Raman
2016/0070979 A1 3/2016 Xu et al.
2016/0140720 A1 5/2016 Naito
2017/0206405 A1 * 7/2017 Molchanov ........ G06K 9/00355

(Continued)

OTHER PUBLICATIONS

Julien Mairal, Piotr Koniusz, Zaid Harchaoui, and Cordelia Schmid, "Convolutional Kernel Networks", arXiv:1406.3332v2 [cs.CV] Nov. 14, 2014 (Year: 2014).*

(Continued)

*Primary Examiner* — Jiangeng Sun

(57) ABSTRACT

A method of processing a multimedia signal includes the operations of obtaining the multimedia signal, determining at least one kernel to be used for processing the obtained multimedia signal, approximating the determined at least one kernel according to a structure of the at least one kernel, and processing the obtained multimedia signal by using the approximated at least one kernel.

15 Claims, 17 Drawing Sheets

(56) References Cited

U.S. PATENT DOCUMENTS

2017/0316578 A1* 11/2017 Fua .......................... G06T 7/73
2018/0032846 A1* 2/2018 Yang .................. G06K 9/00711
2018/0165808 A1* 6/2018 Bagci ........................ G06T 7/00

OTHER PUBLICATIONS

ISA/KR, "International Search Report and Written Opinion of the International Searching Authority," International Application No. PCT/KR2017/015188, dated Apr. 6, 2018, 11 pages.
Wynen, Daan, "Convolutional Kernel Networks for Action Recognition in Videos," Student thesis, KTH, School of Computer Science and Communications (CSC), Stockholm, Sweden, presentation date: Sep. 29, 2015 (available from Oct. 21, 2015), 47 pages.
Hubara, Itay, et al., "Binarized Neural Networks," 30th Conference on Neural Information Processing Systems (NIPS 2016), Barcelona, Spain, 9 pages.
Han, Song, et al., "Deep Compression: Compressing Deep Neural Networks with Pruning, Trained Quanitzation and Huffman Coding," conference paper at ICLR 2016, arXiv:1510.00149v5 [cs.CV] Feb. 15, 2016, 14 pages.
Rodrigues, Bernardo, et al., "Approximating Image Filters with Box Filters," Partially supported by ONR under grant #MURI-N000140710747. Bernardo Rodrigues Pires was partially supported by the Portuguese Foundation for Science and Technology, grant SFRH/BD/37378/2007, 4 pages.
European Patent Office, "Supplementary European Search Report," Application No. EP17887811.2, dated Sep. 27, 2019, 7 pages.

* cited by examiner

FIG. 9

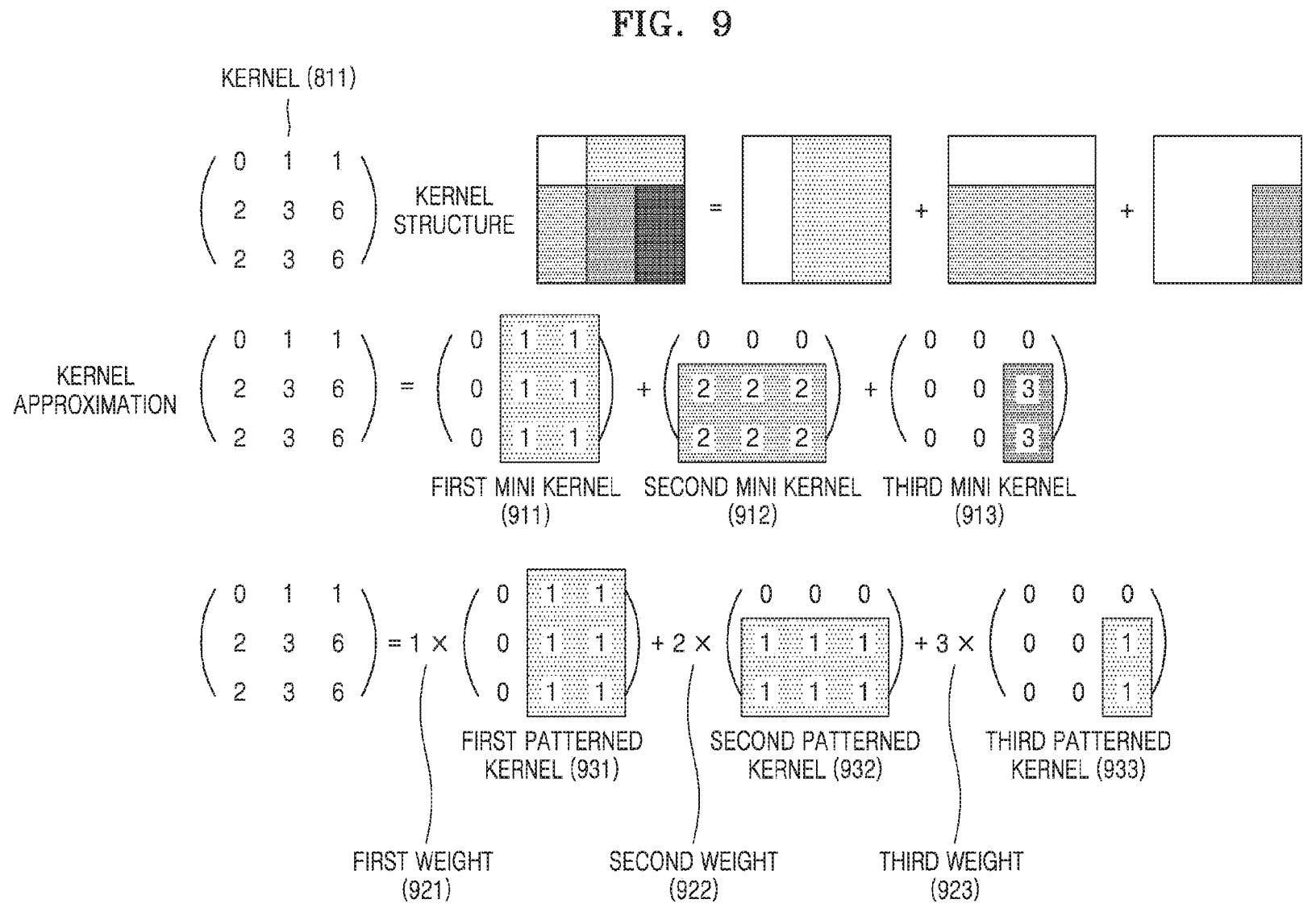

KERNEL (811)

KERNEL STRUCTURE

KERNEL APPROXIMATION

FIRST MINI KERNEL (911)

SECOND MINI KERNEL (912)

THIRD MINI KERNEL (913)

FIRST PATTERNED KERNEL (931)

SECOND PATTERNED KERNEL (932)

THIRD PATTERNED KERNEL (933)

FIRST WEIGHT (921)

SECOND WEIGHT (922)

THIRD WEIGHT (923)

FIG. 10

INPUT SIGNAL (810)

$$\begin{matrix} 1 & 2 & 3 & 4 \\ 5 & 6 & 7 & 8 \\ 9 & 10 & 11 & 12 \\ 13 & 14 & 15 & 16 \end{matrix}$$

FIRST PATTERNED KERNEL (931)

$$\text{Convolve with} \begin{pmatrix} 1 & 1 \\ 1 & 1 \\ 1 & 1 \end{pmatrix} = \begin{pmatrix} 1+2+5+6+9+10 & 2+3+6+7+10+11 & 3+4+7+8+11+12 \\ 5+6+9+10+13+14 & 6+7+10+11+14+15 & 7+8+11+12+15+16 \end{pmatrix}$$

$$= \begin{pmatrix} 33 & 39 & 45 \\ 57 & 63 & 69 \end{pmatrix}$$

$$\begin{matrix} 1 & 2 & 3 & 4 \\ 5 & 6 & 7 & 8 \\ 9 & 10 & 11 & 12 \\ 13 & 14 & 15 & 16 \end{matrix}$$

SECOND PATTERNED KERNEL (932)

$$\text{Convolve with} \begin{pmatrix} 1 & 1 & 1 \\ 1 & 1 & 1 \end{pmatrix} = \begin{pmatrix} 1+2+3+5+6+7 & 2+3+4+6+7+8 \\ 5+6+7+9+10+11 & 6+7+8+10+11+12 \\ 9+10+11+13+14+15 & 10+11+12+14+15+16 \end{pmatrix} = \begin{pmatrix} 24 & 30 \\ 48 & 54 \\ 72 & 78 \end{pmatrix}$$

$$\begin{matrix} 1 & 2 & 3 & 4 \\ 5 & 6 & 7 & 8 \\ 9 & 10 & 11 & 12 \\ 13 & 14 & 15 & 16 \end{matrix}$$

THIRD PATTERNED KERNEL (933)

$$\text{Convolve with} \begin{pmatrix} 1 \\ 1 \end{pmatrix} = \begin{pmatrix} 1+5 & 2+6 & 3+7 & 4+8 \\ 5+9 & 6+10 & 7+11 & 8+12 \\ 9+13 & 10+14 & 11+15 & 11+15 \end{pmatrix} = \begin{pmatrix} 6 & 8 & 10 & 12 \\ 14 & 16 & 18 & 20 \\ 22 & 24 & 26 & 28 \end{pmatrix}$$

INPUT SIGNAL (810)
FIRST MINI KERNEL (911)
FIRST PATTERNED CHANNEL (931)
SECOND MINI KERNEL (912)
SECOND PATTERNED CHANNEL (932)
THIRD MINI KERNEL (913)
THIRD PATTERNED CHANNEL (933)
PARTIAL SUM TABLE (101)
FIRST ARRAY (1131)
FIRST REGION (1141)
SECOND ARRAY (1132)
SECOND REGION (1142)
THIRD ARRAY (1133)
THIRD ARRAY (1143)
1 × 39 + 2 × 48 + 3 × 18   1 × 45+ 2 × 54 + 3 × 20
1 × 63 + 2 × 72 + 3 × 26   1 × 69 + 2 × 78 + 3 × 28
189 213
285 309
SECOND RESULT VALUE (1151)

KERNEL (1210)
N
M
KERNEL STRUCTURE ANALYSIS
PATTERNED KERNEL (1212)
KERNEL APPROXIMATION
≈
W0
W1
Wi
Wk
{X0tl, Y0tl, X0br, Y0br}
{X1tl, Y1tl, X1br, Y1br}
{Xitl, Yitl, Xibr, Yibr}
{Xktl, Yktl, Xkbr, Ykbr}
WEIGHT (1211)
MINI KERNEL IN BINARY FORM (1213)

METHOD, DEVICE, AND SYSTEM FOR PROCESSING MULTIMEDIA SIGNAL

CROSS-REFERENCE TO RELATED APPLICATION

This application is related to and claims priority to Korean Patent Application No. 10-2016-0179310 filed on Dec. 26, 2016, the disclosure of which is incorporated herein in its entirety by reference.

TECHNICAL FIELD

The present disclosure relates to a method, device, and system for processing a multimedia signal.

BACKGROUND

Owing to the remarkable improvement of performance of devices, new multimedia such as 3D stereoscopic images and virtual reality may be provided to users by using various devices.

In general, the new multimedia such as 3D stereoscopic images and virtual reality may be generated by processing existing multimedia signals. Processing multimedia signals may refer to filtering multimedia signals. That is, processing multimedia signals may mean extracting features of multimedia signals, classifying multimedia signals, or converting multimedia signals through a predetermined operation.

In particular, recently, a method of processing a multimedia signal over a neural network used in artificial intelligence capable of learning, an area which has been rapidly developing, has been used. A neural network is a network that has a structure similar to that of the human neural network. The neural network includes a plurality of layers to compute input signals, performs learning based on computed results, and reduces an error range according to learning results, potentially allowing for fast and various types of multimedia processing.

However, when processing a multimedia signal through a neural network, it can be difficult to use the multimedia signal on a miniaturized device such as a wearable device due to high power consumption and frequent use of memory.

SUMMARY

To address the above-discussed deficiencies, it is a primary object to provide a method of processing a multimedia signal with low power consumption and efficient memory usage.

Additional aspects will be set forth in part in the description which follows and, in part, will be apparent from the description, or may be learned by practice of the presented embodiments.

According to certain embodiments of the present disclosure, a method of processing a multimedia signal includes obtaining the multimedia signal; determining at least one kernel to be used for processing the obtained multimedia signal; approximating the determined at least one kernel according to a structure of the at least one kernel; and processing the obtained multimedia signal by using the approximated at least one kernel.

In some embodiments, approximating of the at least one kernel may include dividing the at least one kernel into at least one mini kernel according to a structure of the at least one kernel, and such dividing includes determining a pattern type and a pattern location inside the at least one kernel based on a spatial connectivity in the at least one kernel; and dividing the at least one kernel into the at least one mini kernel based on a result of the determining.

According to certain embodiments, dividing may further include converting each of the at least one mini kernel into a patterned kernel and a weight.

The processing may include applying each of the patterned kernel and the weight to the multimedia signal; and summing result values obtained by the applying of the each of the patterned kernel and the weight to the multimedia signal.

The method may further include: generating a partial sum table including a plurality of resulting arrays to which each of at least one pattern type that the at least one kernel includes is applied to the obtained multimedia signal.

According to certain embodiments of this disclosure, processing may include selecting the plurality of resulting arrays in the partial sum table based on a pattern type of the patterned kernel; and processing the obtained multimedia signal based on the selected plurality of resulting arrays.

In some embodiments, processing of the obtained multimedia signal based on the selected plurality of resulting arrays may include: applying a weight corresponding to each of the patterned kernel to each of the selected plurality of resulting arrays; and summing the plurality of resulting arrays to which the weight is applied.

The selecting of the plurality of resulting arrays in the partial sum table may further include selecting values of some or all of the selected plurality of resulting arrays based on a pattern location in the divided at least one kernel.

The method may further include: extracting a feature from the processed multimedia signal, wherein the at least one kernel is determined based on the feature to be extracted from the multimedia signal.

According to certain embodiments, determining may include determining the pattern type and the pattern location by minimizing a difference between the at least one kernel and a sum of the at least one mini kernel.

The processing may include performing a predetermined operation on the multimedia signal using the approximated at least one kernel.

The processing of the obtained multimedia signal may include: additionally processing the processed multimedia signal using an additional kernel; and processing the obtained multimedia signal in parallel by using a kernel other than the at least one kernel.

According to an aspect of certain embodiments according to this disclosure, a non-transitory computer-readable recording medium includes a recorded program for executing the method.

According to an aspect of at least one embodiment of the present disclosure, a device for processing a multimedia signal includes a signal obtainer configured to obtain the multimedia signal; and a processor configured to determine at least one kernel to be used for processing the obtained multimedia signal, to approximate of the at least one kernel according to a structure of the at least one kernel, and process the obtained multimedia signal using the approximated at least one kernel.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 8 through 11 illustrate aspects of a multimedia signal processing method using an approximated kernel and a convolution type multimedia signal processing method according to certain embodiments;

DETAILED DESCRIPTION

Figure 1:
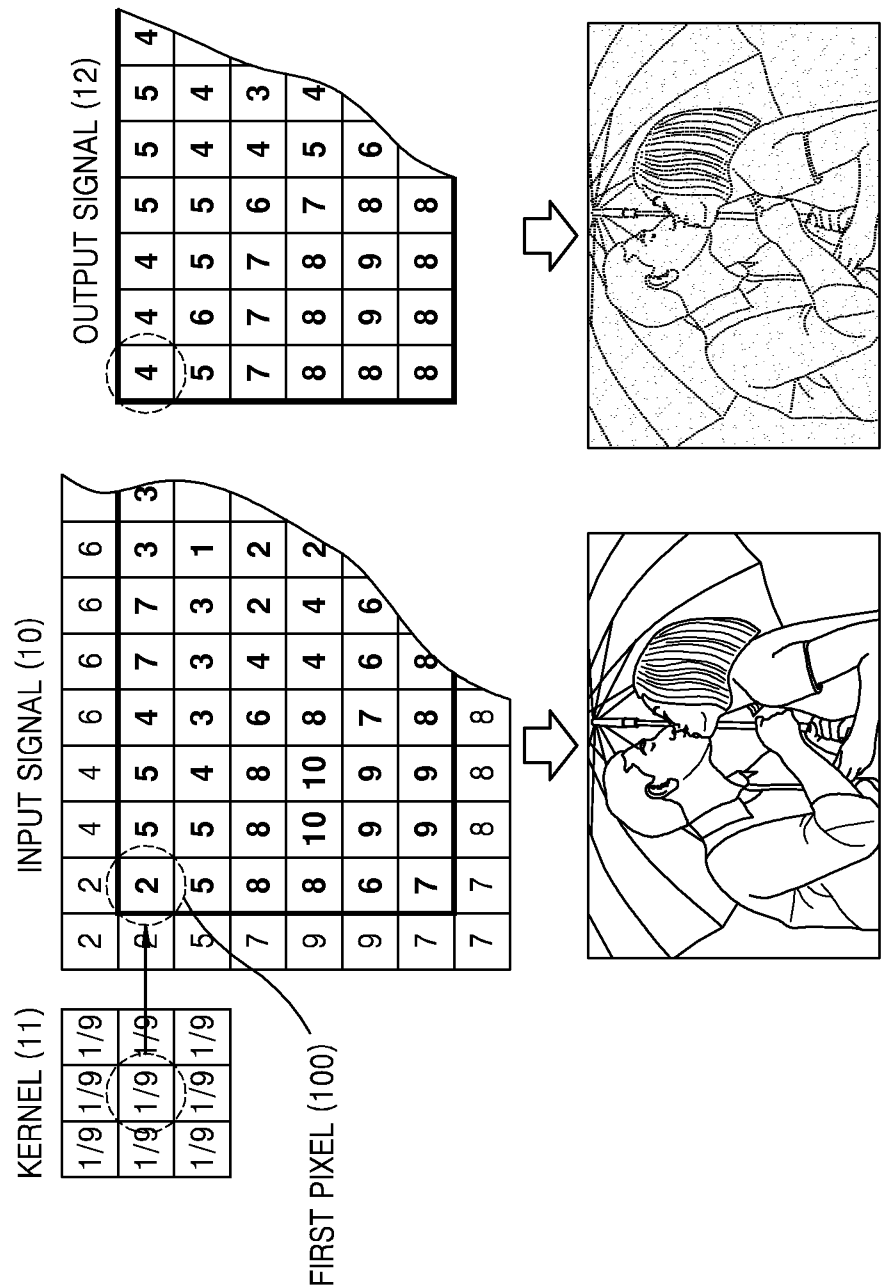
FIG. 1 illustrates a diagram for explaining multimedia signal processing according to certain embodiments of this disclosure.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be selected by the applicant, and in this case, the meaning of the selected terms will be described in detail in the detailed description of the invention. Thus, the terms used herein have to be defined based on the meaning of the terms together with the description throughout the specification.

Throughout the specification, it will also be understood that when an element is referred to as being "connected to" another element, it may be directly connected to the other element, or intervening elements may also be present. Also, when a part "includes" or "comprises" an element, unless there is a particular description contrary thereto, the part may further include other elements, not excluding the other elements. In the following description, terms such as "unit" and "module" indicate a unit for processing at least one function or operation, wherein the unit and the block may be embodied as hardware or software or embodied by combining hardware and software. In the specification, the term "and/or" includes any and all combinations of one or more of the associated listed items. Also, expressions such as "at least one of," when preceding a list of elements, modify the entire list of elements and do not modify the individual elements of the list.

Throughout the specification, an apparatus or device may include, but is not limited to, various devices such as a personal computer (PC), a cellular phone, a smartphone, a television (TV), a tablet PC, a notebook, a personal digital assistant (PDA), a portable multimedia player (PMP), navigation, an MP3 player, a digital camera, a refrigerator, a washing machine, a cleaner, a sensor, and a device mounted in a car.

Throughout the specification, a kernel may be understood to include a matrix having weights that are used to process signals. An example of the kernel is a low-pass kernel that removes noise, a Gaussian kernel that blurs corners, and a high-pass kernel that sharpens corners. As used herein, a kernel may be understood as referring, without limitation, to a filter or a mask.

According to certain embodiments as described herein, a kernel may be divided into at least one mini kernel according to a kernel structure. Throughout the specification, approximation of the kernel may refer to dividing one kernel into at least one mini kernel according to the kernel structure. When the divided at least one mini kernels are summed, the summed mini kernel may have the same as the kernel before divided or may have an error within a predetermined range.

According to certain embodiments as described herein, a mini kernel can refer to a kernel in which one kernel is divided into at least one or a plurality of kernels. One kernel may be divided into at least one mini kernel according to the kernel structure. Each of the mini kernels may, depending on embodiments, be changed into a patterned kernel and a weight.

According to certain embodiments as described herein, a patterned kernel may, without limitation, refer to a kernel having a predetermined pattern or a kernel excluding a weight and a zero value from the mini kernel.

According to certain embodiments as described herein, a kernel structure may, without limitation, refer to how an arrangement of values in a kernel is organized. Also, a pattern type may, without limitation, mean a structure (pattern) of patterned kernels.

According to certain embodiments as described herein, a pattern location may, without limitation, refer to a location of a patterned kernel in a kernel. For example, the patterned kernel of a 1×2 (1 row and 2 columns) structure may be located in various portions of the kernel in the kernel structure.

FIG. 1 illustrates aspects of multimedia signal processing according to certain embodiments of this disclosure.

FIG. 1 illustrates a non-limiting example according to certain embodiments of this disclosure, where an input signal 10 is an image. A device receives image data including at least one pixel and processes the obtained image data by using a kernel. Signal processing can be used to obtain a predetermined result by processing an input signal, to extract a feature of the input signal so that the device may perform a predetermined determination based on the input signal, or to generate a feature map. The predetermined determination may include object recognition, determination of a direction, and the like, but is not limited to the above example.

Referring to FIG. 1, a predetermined pixel in the image is affected by surrounding pixels. Accordingly, the device performs a convolution operation as part of multimedia signal processing. According to embodiments, convolution operation entails applying a kernel 11, which is a matrix having weights, to the image pixels. For example, the convolution operation may be an operation of multiplying a value of a predetermined pixel and a pixel value around the predetermined pixel by a weight of a kernel, and summing all resulting multiplication values of respective corresponding cells in the kernel (values of M rows and N columns).

In the non-limiting example of FIG. 1, akernel 11 having a weight of 1/9 is applied to the input signal 10 with a size of 3×3. If the kernel 11 is applied to a first pixel 100 having a size of 2 in the input signal 10, the remaining 8 pixels around the first pixel 100 also undergo the same operation according to a size of the kernel 11. An operation to which the kernel 11 is applied is as follows.

$$(1/9)\times 2+(1/9)\times 2+(1/9)\times 4+(1/9)\times 6+(1/9)\times 2+(1/9)\times 5+(1/9)\times 5+(1/9)/9)\times 5=4$$

Thus, an output signal 12 is a signal in which a value of the first pixel 100 of the input signal 10 has changed from 2 to 4. Other pixels may also undergo the same operation. Thus, according to embodiments, the output signal 12 may refer to a signal modified by sweeping the input signal 10 with the kernel 11. In this illustrative example, convolution refers to changing a value of a center (e.g., a particular pixel) by reflecting values of surroundings (e.g., surrounding pixels of the particular pixel). Also, according to some embodiments, the output signal 12 may be a feature map generated from the input signal 10.

Figure 2:
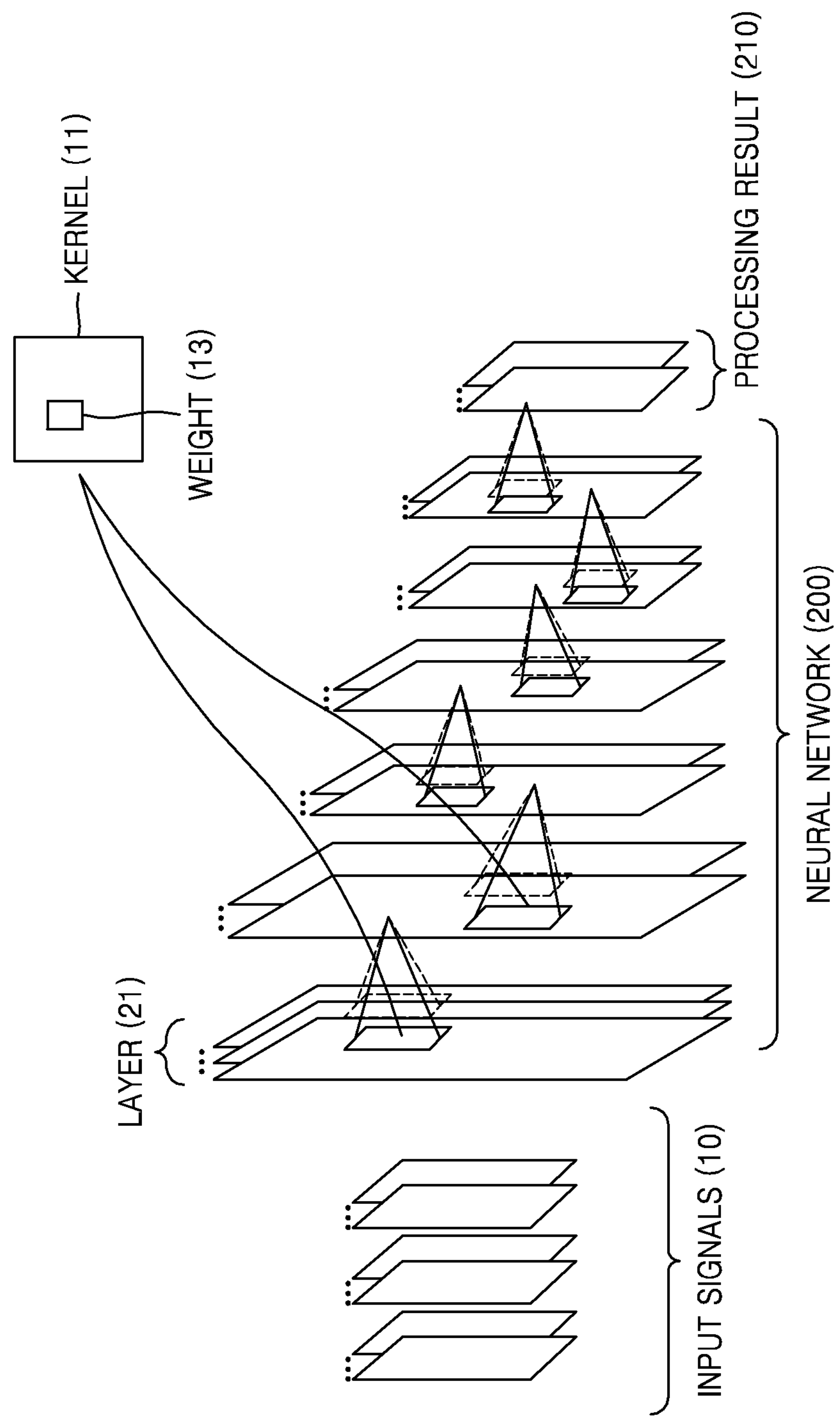
FIG. 2 illustrates a system for processing a multimedia signal over a neural network according to certain embodiments of this disclosure.
Figure 3:
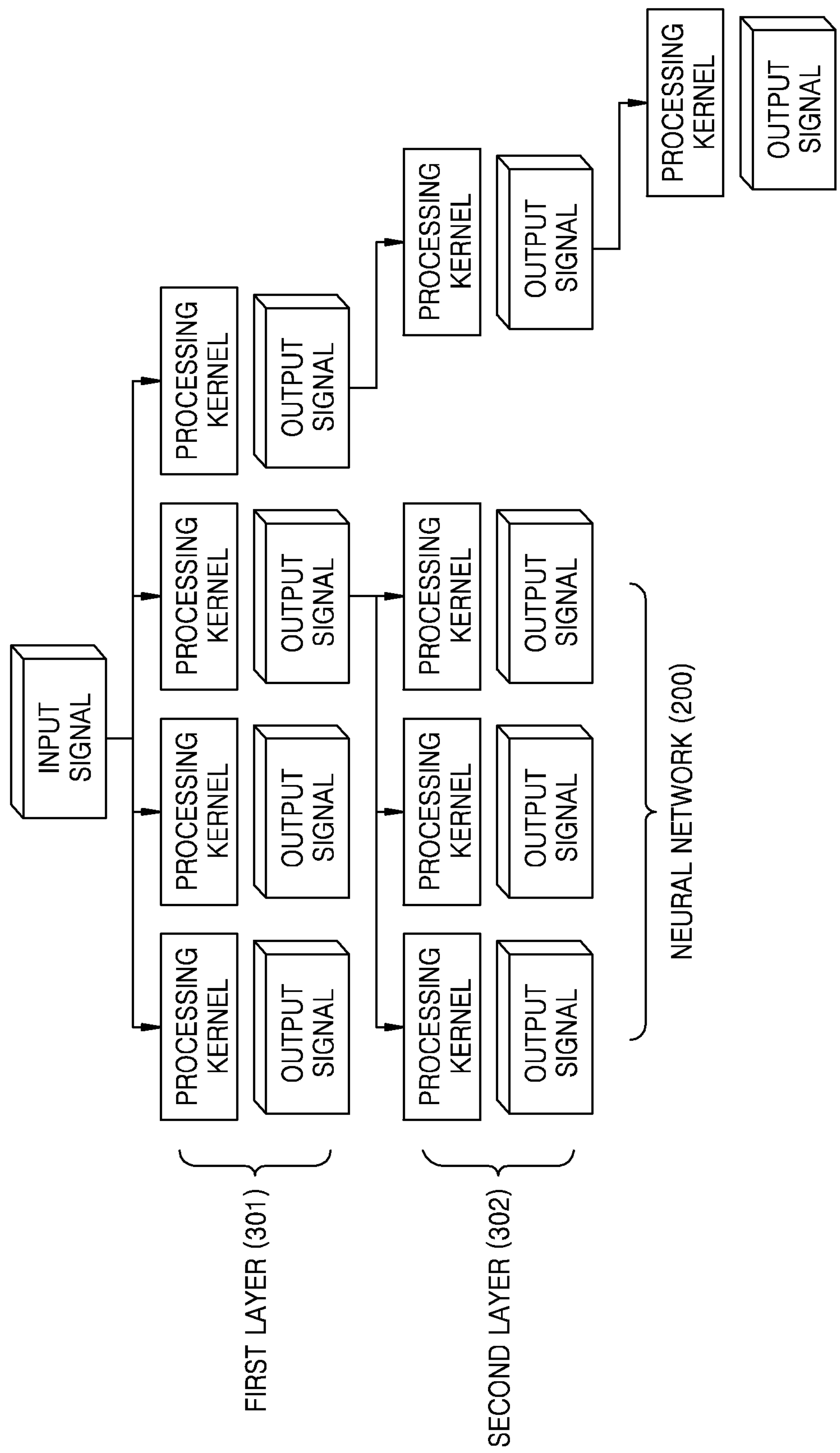
FIG. 3 further illustrates a system for processing a multimedia signal over a neural network according to certain embodiments of this disclosure.

FIGS. 2 and 3 illustrate a system for processing a multimedia signal over a neural network.

In recent years, artificial neural networks have been used in signal processing to obtain highly accurate determination results or highly accurate results. An artificial neural network is a network that has a structure similar to that of the human neural network. One example of an artificial neural network is a convolution neural network.

Referring to FIG. 2, a device according to certain embodiments of this disclosure may input the input signals 10 to an artificial neural network 200. The input signals 10 may be images, and each of the input signals 10 may include a plurality of channels.

The artificial neural network 200 may, according to certain embodiments, include a plurality of layers 21. A process of generating a feature map by applying the kernel 11 including a weight 13 to the input signal 10 may be performed with respect to each of the layers 21. At least one feature map may be generated with respect to each of the layers 21. A kernel 11 of a plurality of kernels may be applied to the input signals 10 with respect to each of the layers 21. The weight 13 included in each of the kernels 11 may be updated by learning processes of the artificial neural network 200.

According to some embodiments, a first feature may be generated with respect to a first layer of the artificial neural network 200 by convolving the kernel 11 with the input signal 10, and a second feature map may be generated with respect to a second layer of the artificial neural network 200 by convolving the generated first feature map with the kernel 11.

That is, the artificial neural network 200 may process the input signal 10 to increase the accuracy of determination or to increase a success rate of a target task. Accordingly, a device using the artificial neural network 200 may perform a more accurate determination operation by using a processing result 210 output through the plurality of layers of the artificial neural network 200. Additionally, the artificial neural network 200 may perform a pooling operation that simplifies an output signal before outputting the output signal.

FIG. 3 illustrates an example of processing of an input signal over an artificial neural network 200 according to certain embodiments of this disclosure. As described above, in the artificial neural network 200, a kernel is applied to the input signal. As shown in FIG. 3, in the artificial neural network 200, a plurality of kernels may be applied in parallel to the input signal.

In a first layer 301, four kernels are applied to the input signal to output four output signals. In a second layer 302, at least one of the four output signals may be selected to apply each of the plurality of kernels. The output signals are signals changed by the kernels, and may be, for example, images having a blur effect applied to an original image. The output signals may also be feature maps as described above.

Figure 4:
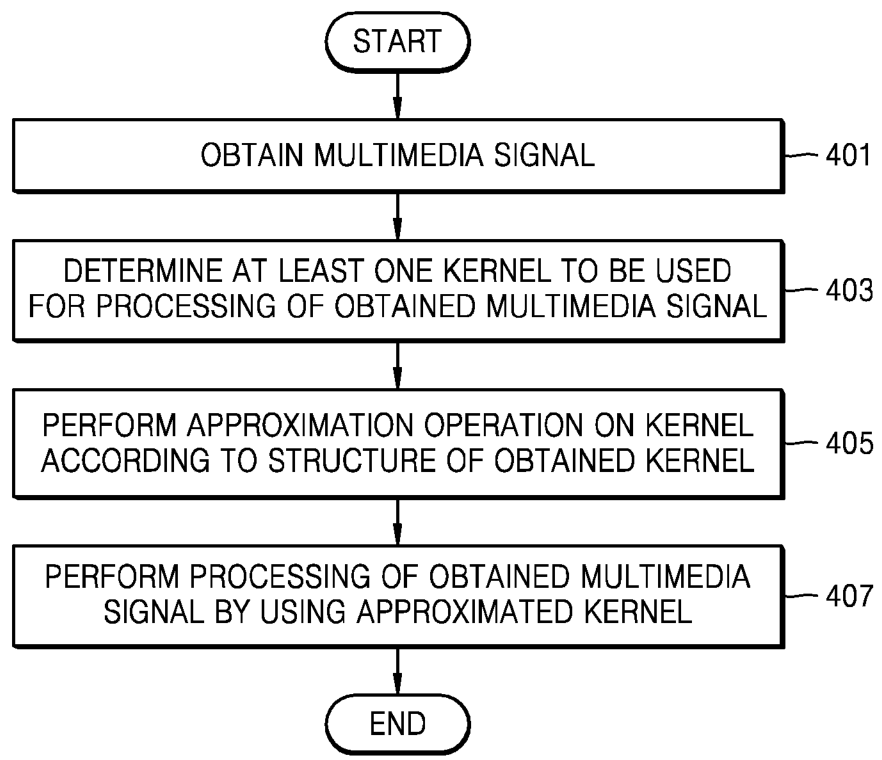
FIG. 4 illustrates, via a flowchart, operations of a method of processing a multimedia signal according to certain embodiments of the present disclosure.

FIG. 4 illustrates, in flowchart format, operations of a method of processing a multimedia signal according to certain embodiments of the present disclosure.

In the non-limiting example of FIG. 4, at operation 401, a device may obtain a multimedia signal. The multimedia signal may be received from a signal input unit such as a camera or a microphone, or may be received from an external device such as a server, the device may also obtain the multimedia signal from a memory. However, the present disclosure is not limited to the above example.

According to some embodiments, the multimedia signal may be an image including at least one pixel but is not limited to the above example. The multimedia signal may also, for example, include a voice.

In operation 403, the device may determine at least one kernel to be used for processing of the obtained multimedia signal.

According to some embodiments, the kernel may be determined based on a feature to be extracted in the multimedia signal. For example, when the input signal is an image signal, different kernels may be applied to the image signal to extract a boundary part in the image and to extract a white part in the image.

In operation 405, the device may perform an approximation operation on the kernel according to a structure of the obtained kernel. As described above, approximation of a kernel may mean dividing one kernel into at least one mini kernel according to a kernel structure.

According to some embodiments, the device may determine a pattern type and a pattern location inside the obtained kernel based on a spatial connectivity of the obtained kernel and divide the obtained kernel into at least one mini kernel based on a result of determination. Spatial connectivity may include information about what pattern type is used to connect values in the kernel to each other. That is, spatial connectivity may include information about a connection structure of patterns in the kernel.

According to some embodiments, the device may determine the pattern type and the pattern location included in the obtained kernel such that a difference between the obtained kernel and a sum of the divided mini kernels is minimized. The device may divide even the same kernel into various pattern types.

Further, according to some embodiments, the device may divide the kernel into a pattern having the least error with the obtained kernel among various pattern types. For example, the device may search for the number of cases where the obtained kernel may be divided by considering the number of all cases by using a search method such as Exhaustive Search, and may divide the kernel such that the sum of the divided mini kernels has the smallest error with the obtained kernel according to a search result. The search method is not limited to the above example.

Also, according to some embodiments, the device may convert each of the divided at least one mini kernels into a patterned kernel and a weight. The patterned kernel may, for the purposes of this disclosure, refer to a kernel excluding a value of 0 from a kernel in binary form of values of 0 and 1.

According to some embodiments, the kernel excluding a value of 0 from the kernel in binary form may refer to a reconstructed kernel excluding 0. For example, in a binary kernel with a 3×3 structure, if there is only 1 in 1 row and 1 column and remaining values are 0, the device may be reconstructed into a kernel with a 1×1 structure. The reconstructed kernel may be a patterned kernel.

In certain embodiments according to this disclosure, at operation 407, the device may process the obtained multimedia signal by using the approximated kernel.

According to some embodiments, the device may perform a predetermined operation by using the multimedia signal and the approximated kernel. For example, the device may apply each patterned kernel and the weight to the multimedia signal, and sum result values obtained by applying each patterned kernel and the weight. That is, the device may reduce the number of multiplication operations by dividing each kernel into patterned kernels and a weight, convolving each of the patterned kernels with the multimedia signal, and then applying the weight.

Also, according to some embodiments, the device may generate a partial sum table including a plurality of resulting arrays by applying each of at least one pattern type that may be included in the kernel to the obtained multimedia signal. The device may also store the generated partial sum table.

For example, assuming that pattern types that may be included in a 3×3 kernel are patterns of 1×1, 1×2, 1×3, 2×1, 2×2, 2×3, 3×1, 3×2, and 3×3, the device may apply each of patterned kernels of types of 1×1, 1×2, 1×3, 2×1, 2×2, 2×3, 3×1, 3×2, and 3×3 to the multimedia signal and may store values that are results obtained by applying the patterned kernels in the form of a table. According to some embodiments, each value of the table may be an array.

That is, the partial sum table may be a table that stores result values by applying kernels having at least one pattern type to the multimedia signal. According to some embodiments, after generating the partial sum table, the device may select at least some values in the partial sum table according to the pattern type, the pattern location and the weight of the obtained kernel. The device may perform an addition operation instead of performing a convolution operation on each kernel every time by applying the weight to the selected values and then summing the selected values to which the weight is applied, thereby reducing the number of memory accesses and reducing power consumption.

According to some embodiments, the device may perform additional processing on the multimedia signal processed by using an additional kernel. Also, according to some embodiments, the device may process the multimedia signal in parallel by using a kernel other than the obtained kernel. That is, operations 401 to 405 may comprise part of a method of processing the multimedia signal that is performed in one layer of a neural network. Additionally, the method of processing the multimedia signal in shown in operations 401 to 405 may be used in another layer of the neural network. The methods of processing the multimedia signal of the layers in operations 401 to 405 may be used in parallel.

Figure 5:
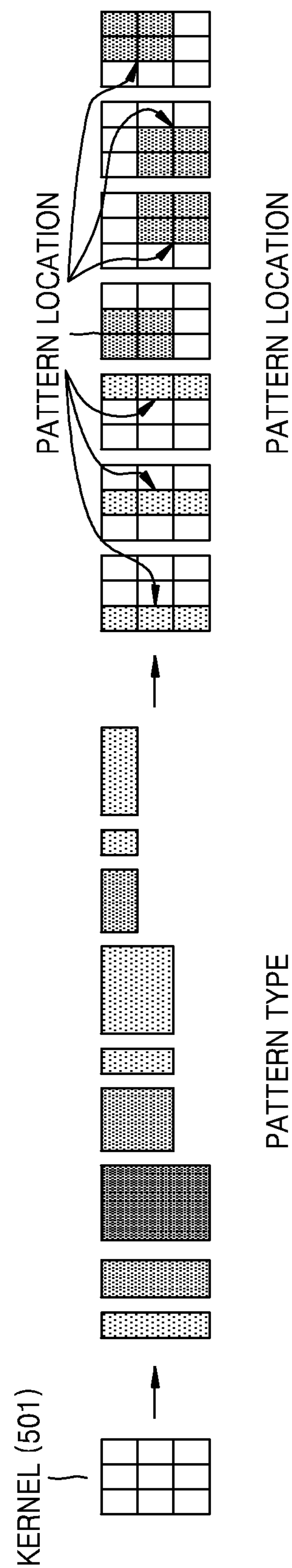
FIG. 5 illustrates a pattern type and a pattern location of a kernel according to certain embodiments of the present disclosure.

FIG. 5 illustrates aspects of a pattern type and a pattern location of a kernel 501 according to some embodiments of the present disclosure.

Referring to FIG. 5, the kernel 501 may have various pattern types. In other words, the kernel 501 may be divided into various patterned kernels. Pattern types that may be included in the kernel 501 may differ according to a value in the kernel 501 and may differ according to a size of the kernel 501. For example, a 3×3 kernel may have patterns of 1×1, 1×2, 1×3, 2×1, 2×2, 2×3, 3×1, 3×2, and 3×3 and may be divided into at least one patterned kernel and a weight according to a value in the kernel.

Also, as shown in the non-limiting example of FIG. 5, even in the same pattern, locations in the kernel 501 may be different. As shown in the illustrated example, a 1×3 pattern may be located in three places in the 3×3 kernel. Thus, even different kernels may include the same patterned kernel.

Figure 6:
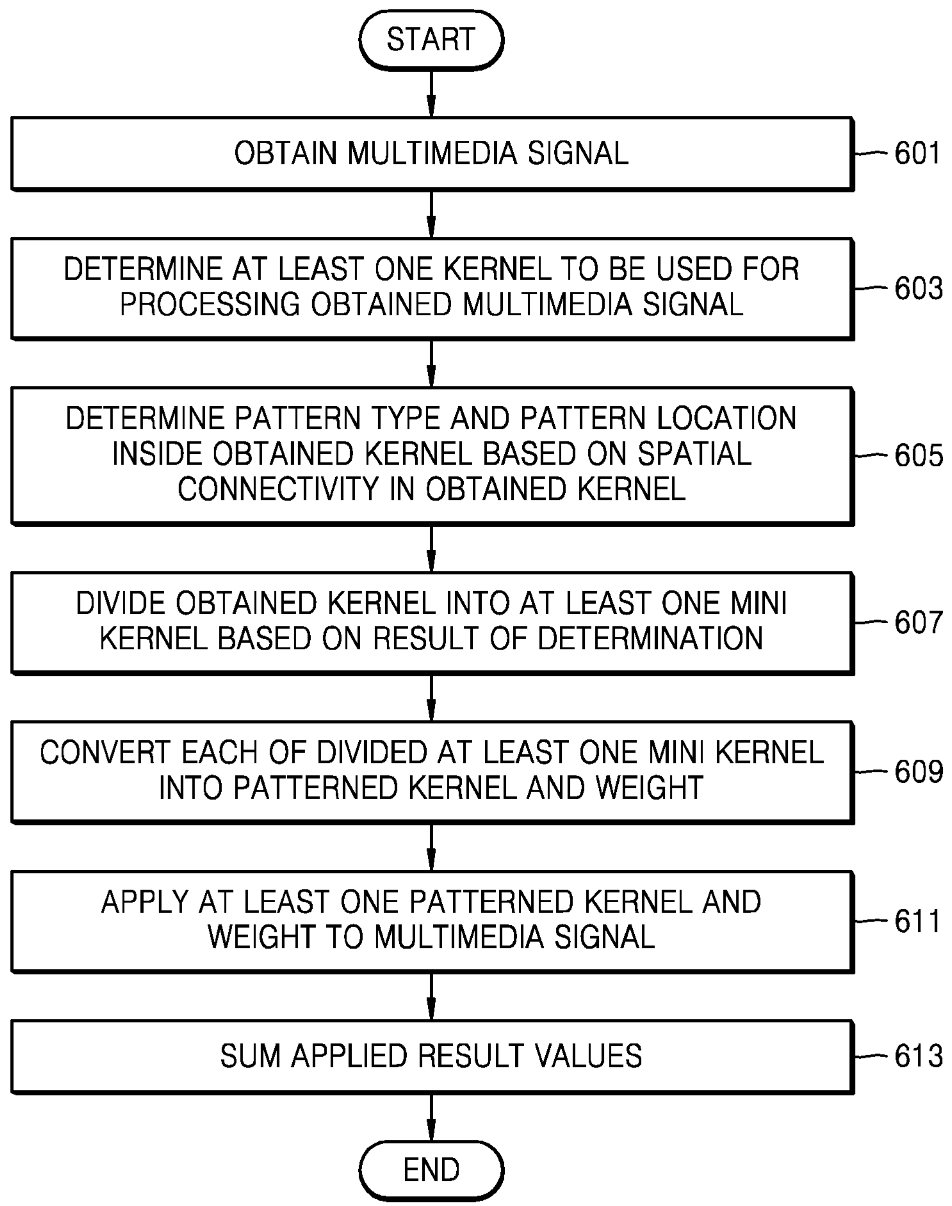
FIG. 6 illustrates, via a flowchart, operations of a multimedia signal processing method using an approximated kernel according to certain embodiments of this disclosure.

FIG. 6 illustrates in flowchart format, a multimedia processing method using an approximated kernel according to some embodiments of the present disclosure.

In operation 601, a device may obtain a multimedia signal.

Next, at operation 603, the device may determine at least one kernel to be used for processing of the obtained multimedia signal. Since operations 601 and 603 correspond to those described above, detailed descriptions thereof are omitted.

In operation 605, the device may determine a pattern type and a pattern location inside the obtained kernel based on a spatial connectivity in the obtained kernel.

According to some embodiments, the device may determine which pattern is included in the obtained kernel. That is, since spatial connectivity may include information about a connection structure of patterns existing in the kernel, the device may determine how to divide the kernel based on various pattern types that may be included in the kernel and pattern locations.

In operation 607, the device may divide the obtained kernel into at least one mini kernel based on a result of determination. Approximation of the kernel performed by the device may mean dividing the obtained kernel into at least one mini kernel. A sum of the divided at least one mini kernel may be the same as the obtained kernel or may have an error within a predetermined range.

In operation 609, the device may convert each of the divided at least one mini kernel into a patterned kernel and a weight. For example, the device may convert one of the divided mini kernels into a patterned kernel with a weight of 2 and a 2×2 structure and a patterned kernel with a weight of 3 and a 1×2 structure.

In operation 611, the device may apply the at least one patterned kernel and the weight to the multimedia signal. According to some embodiments, the device may convolve the at least one patterned kernel with the multimedia signal, and then multiply the weight. According to certain embodiments, the patterned kernel comprises a kernel only including 1, does not require a multiplication operation when performing convolution with a multimedia signal value, and may need the multiplication operation only when the weight is multiplied.

Also, according to some embodiments, the device may apply the at least one patterned kernel and the weight to the multimedia signal based on a partial sum table. As described above, the device may generate the partial sum table including a plurality of resulting arrays by applying at least one pattern type that may be included in the kernel to the obtained multimedia signal.

According to some embodiments, the device may select all or some arrays of the generated partial sum table based on the patterned kernel, select some or all of regions in the selected arrays, and multiply values in the selected regions by the weight. The device may multiply the values in the selected regions by weights, and then sum the corresponding values.

Also, according to some embodiments, the device may select some or all of values in the selected arrays in the partial sum table based on a pattern location where the patterned kernel is located in the kernel. That is, as described above, pattern locations in the kernel may be different from each other, and the values used in the arrays of the partial sum table may be different depending on the pattern locations.

In operation 613, the device may sum applied result values. According to some embodiments, a sum result may be a result of processing the multimedia signal. That is, the device may sum all result values by applying the patterned kernel and the weight to the multimedia signal, thereby obtaining the same result value as a result by applying the obtained kernel to the multimedia signal or obtaining a result value having an error within a predetermined range.

Figure 7:
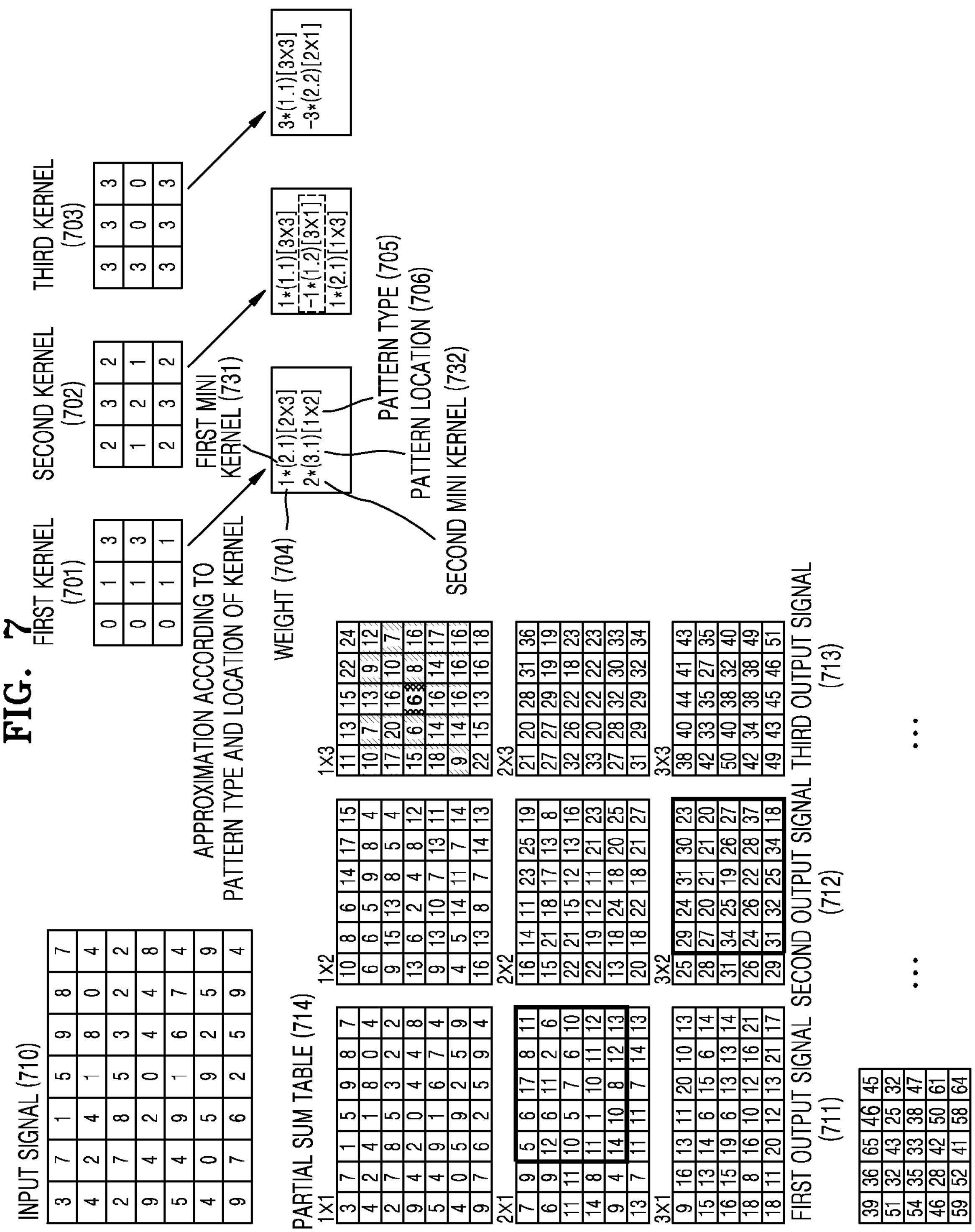
FIG. 7 illustrates a method of generating a partial sum table according to certain embodiments of this disclosure.

FIG. 7 illustrates aspects of a method of generating a partial sum table 714 according to some embodiments of the present disclosure.

As described above, the device may obtain an input signal 710. The device may also obtain a first kernel 701, a second kernel 702 and a third kernel 703, which, in this non-limiting example, are kernels for processing the input signal 710.

According to certain embodiments, device may also analyze and determine a pattern type 705 and a pattern location 706 of each of the kernels 701 through 703, and may separate the kernels 701 through 703 into a patterned kernel and a weight.

For example, referring to FIG. 7, the first kernel 701 may be divided into two mini kernels, each of which may be divided into a first mini kernel 731, which is a patterned kernel having a structure of a weight of 1 and 3 rows and 2 columns and a second mini kernel 732, which is a patterned kernel having a structure of a weight of 1 and 2 rows and 1 column. Also, in the first mini kernel 731, the patterned kernel is located in $2^{nd}$ row and $1^{st}$ column, and in the second mini kernel 732, the patterned kernel is located in $3^{nd}$ row and 1 column.

According to some embodiments, the device may generate the partial sum table 714 which includes a plurality of resulting arrays by applying each of at least one pattern type that the one or more kernels 701 through 703 may include to the input signal 710. Referring to FIG. 7, since pattern types that a 3×3 kernel may include are 1×1, 1×2, 1×3, 2×1, 2×2, 2×3, 3×1, 3×2, and 3×3, the device may convolve each patterned kernel of a 1×1, 1×2, 1×3, 2×1, 2×2, 2×3, 3×1, 3×2, and 3×3 structure and the input signal 710, thereby generating the partial sum table 714. For example, in FIG. 7, a 1×1 patterned kernel is a kernel of 1 row and 1 column structure that includes only value of 1. When a convolution operation is performed with the input signal 710, the same array as the input signal 710 is generated as a result value, and the generated array is stored in the partial sum table 714 as an array corresponding to the 1×1 patterned kernel.

According to some embodiments, the device may select at least some arrays in the partial sum table 714 based on the patterned kernel and a pattern location in the kernel. As described above, the first kernel 701 may be divided into the patterned kernel having the structure of a weight of 1 and 3 rows and 2 columns and the patterned kernel having the structure of a weight of 1 and 2 rows and 1 column. The device may select an array corresponding to the patterned kernel of a 3×2 structure and an array corresponding to the patterned kernel of a 2×1 structure from the partial sum table 714.

Also, according to some embodiments, the device may multiply the selected arrays by respective weights. That is, the device may multiply the array corresponding to the patterned kernel of the 3×2 structure by the weight of 1, and multiply the array corresponding to the patterned kernel of the 2×1 structure by the weight of 2.

Additionally, according to some embodiments, the device may select only some regions or only some cells from the selected arrays according to the pattern location. That is, the device may only select a zero value of some from the selected arrays.

As a non-limiting example, in the case of a portion where the zero value is located in a divided mini kernel, since no operation is necessary, the device may not select a region corresponding to the portion where the zero value is located in the divided mini kernel among entire values in the arrays. The device may sum only selected some values according to the pattern location from the selected arrays.

Referring to the example shown in FIG. 7, the patterned kernel is located in the $2^{nd}$ row and $1^{st}$ column of the first mini kernel 731 and the patterned kernel is located in the $3^{rd}$ row and $1^{st}$ column of the second mini kernel 732. That is, since the first mini kernel 701 has a pattern of 3 rows and 2 columns at a location of $2^{nd}$ row and $1^{st}$ column, only 0 value is present in the $1^{st}$ row and $1^{st}$ column. Therefore, since values of $1^{st}$ column of the arrays in the partial sum table 714 need not be operated, the device may not select values of $1^{st}$ column of the arrays in the partial sum table 714 (a part other than an indicated region). For the same reason, the device may not select the values of $1^{st}$ column, $2^{nd}$ column, and $6^{th}$ row from array values corresponding to the second mini kernel 732.

According to some embodiments, the device may sum the selected values in the arrays to output an output signal. That is, the device may generate a first output signal 711 obtained by processing the input signal 710 using the first kernel 701. The device may perform procedures corresponding to those described above by using the second input signal 710, the second kernel 702, and the third kernel 703, thereby generating the output signal 712 and the third output signal 713.

FIGS. 8 to 11 illustrate aspects of a multimedia signal processing method using an approximated kernel and a convolution type multimedia signal processing method according to certain embodiments of the present disclosure.

Figure 8:
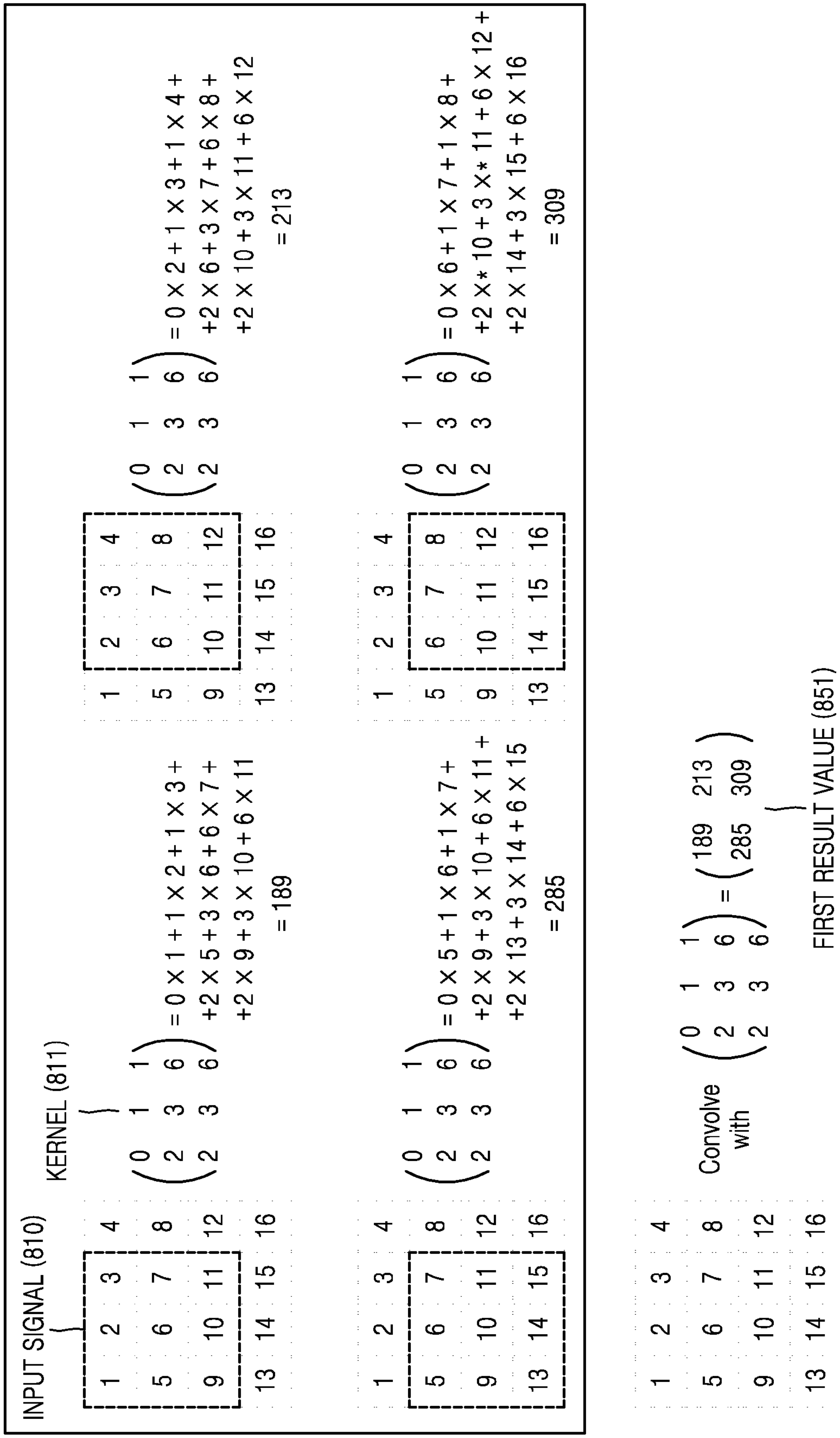

FIG. 8 illustrates a method of directly convolving an input signal 810 and a kernel 811 according to the present disclosure. In the non-limiting example of FIG. 8, a device may apply the input signal 810 to the kernel 811 without approximating the kernel 811. Referring to FIG. 8, the device may apply the kernel 811 to the input signal 810. The input signal 810 is a 4×4 matrix. The kernel 811 is a 3×3 matrix. A convolution result of the input signal 810 and the kernel 811 is a matrix having a 2×2 structure, and a first result value 851 is as shown in FIG. 8.

Referring again to the non-limiting example of FIG. 8, when the input signal 810 and the kernel 811 are convolved, multiplication is performed 36 times, and the number of accumulated operations is 36. Also, since the device must access a memory each time when an operation is performed, the number of memory accesses is 72, which is the number of each number to be calculated.

Figure 11:
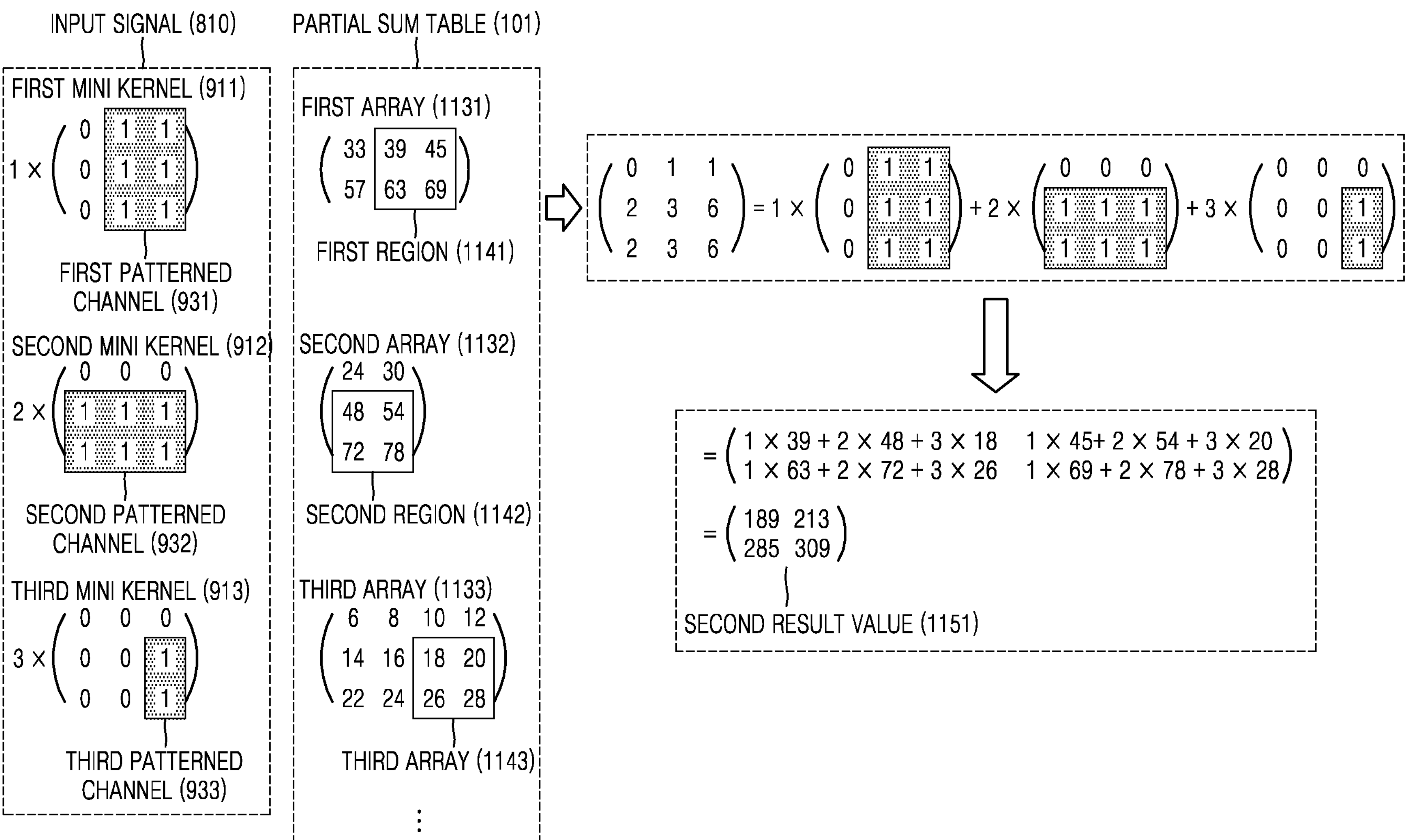

FIGS. 9 through 11 illustrate aspects of a processing method in association with a kernel approximation according to some embodiments of the present disclosure. A device may analyze a kernel structure to determine what type of pattern is present in a kernel.

The device may approximate the kernel 811 based on a result of determination. For example, the device may divide the kernel 811 into a first mini kernel 911, a second mini kernel 912, and a third mini kernel 913. The first mini kernel 911 may be converted to a first patterned kernel 931 of a first weight 921 and 3 rows and 2 columns. The second mini kernel 912 may be converted to a second patterned kernel 932 having a second weight 922 and 2 rows and 3 columns structure. The third mini kernel 913 may be converted into a third patterned kernel 933 of a third weight 923 and having a structure of 2 rows and 1 column. Pattern locations of the mini kernels 911 to 913 are as shown in FIG. 9.

Referring to the illustrative example shown in FIG. 10, the device may, according to embodiments, generate a partial sum table by applying each of the first patterned kernel 931 to the third patterned kernel 933 to the input signal 810. That is, the device may convolve the input signal 810 and the first patterned kernel 931, convolve the input signal 810 and the second patterned kernel 932, and convolve the input signal 810 and the third patterned kernel 933.

According to some embodiments, the device may convolve the input signal 810 and a patterned kernel other than the patterned kernels 931 to 933 included in the kernel 811 to store the partial sum table.

Referring to the example shown in FIG. 11, the device may, according to embodiments, select a first array 1131 corresponding to the first patterned kernel 931, a second array 1132 corresponding to the second patterned kernel 932, and a third array 1133 corresponding to the third patterned kernel 933 from a partial sum table 1101.

Also, the device may exclude a part of the first array 1131 to the third array 1133 which requires no operation according to locations of 0 values in the mini kernels 911 to 913. For example, the device may select only a first region 1141 in the first array 1131, select only a second region 1142 in the second array 1132, and a third region 1143 in the third array 1133.

The device may then multiply the weights 921 to 923 corresponding to values of the selected regions 1141 to 1143, respectively. According to some embodiments, the first to third regions 1141 to 1143 may be selected after multiplying the weights 921 to 923 corresponding to values of the selected regions 1141 to 1143, respectively.

The device may sum values of selected regions. That is, the device may sum all values of $1^{st}$ row and $1^{st}$ column in each region and may sum all values of $1^{st}$ row and $2^{nd}$ column in each region. The device may also sum $2^{nd}$ row and $1^{st}$ column and $2^{nd}$ row and $2^{nd}$ column in the same way. That is, the device may sum values of each cell in each region. The second result value 1151 is as shown in FIG. 11.

The first result value 851 in FIG. 8 and the second result value 1151 in FIG. 11 are, according to some embodiments, the same. However, according to the method illustrated in the examples of FIGS. 9 through 11, multiplication is performed only 12 times. The number of accumulated operations is 14, which is in contrast to the method, as illustrated in FIG. 8, wherein the accumulated operations continuously increases. Also, since the device generates the partial sum table, the device may perform processing by multiplying only a weight, and thus the number of memory accesses is only 26. That is, according to certain embodiments, the kernel approximation, the number of multiplications, the number of accumulated operations, and the number of memory accesses are greatly reduced.

In particular, in certain embodiments, when the device generates and stores a partial sum table, when a plurality of different kernels are applied to the same input signal, the device merely select arrays in the partial sum table corresponding to a pattern type and a pattern location included by each of the kernels and multiply a weight, and thus an effect is further increased when the plurality of kernels are applied.

Figure 12:
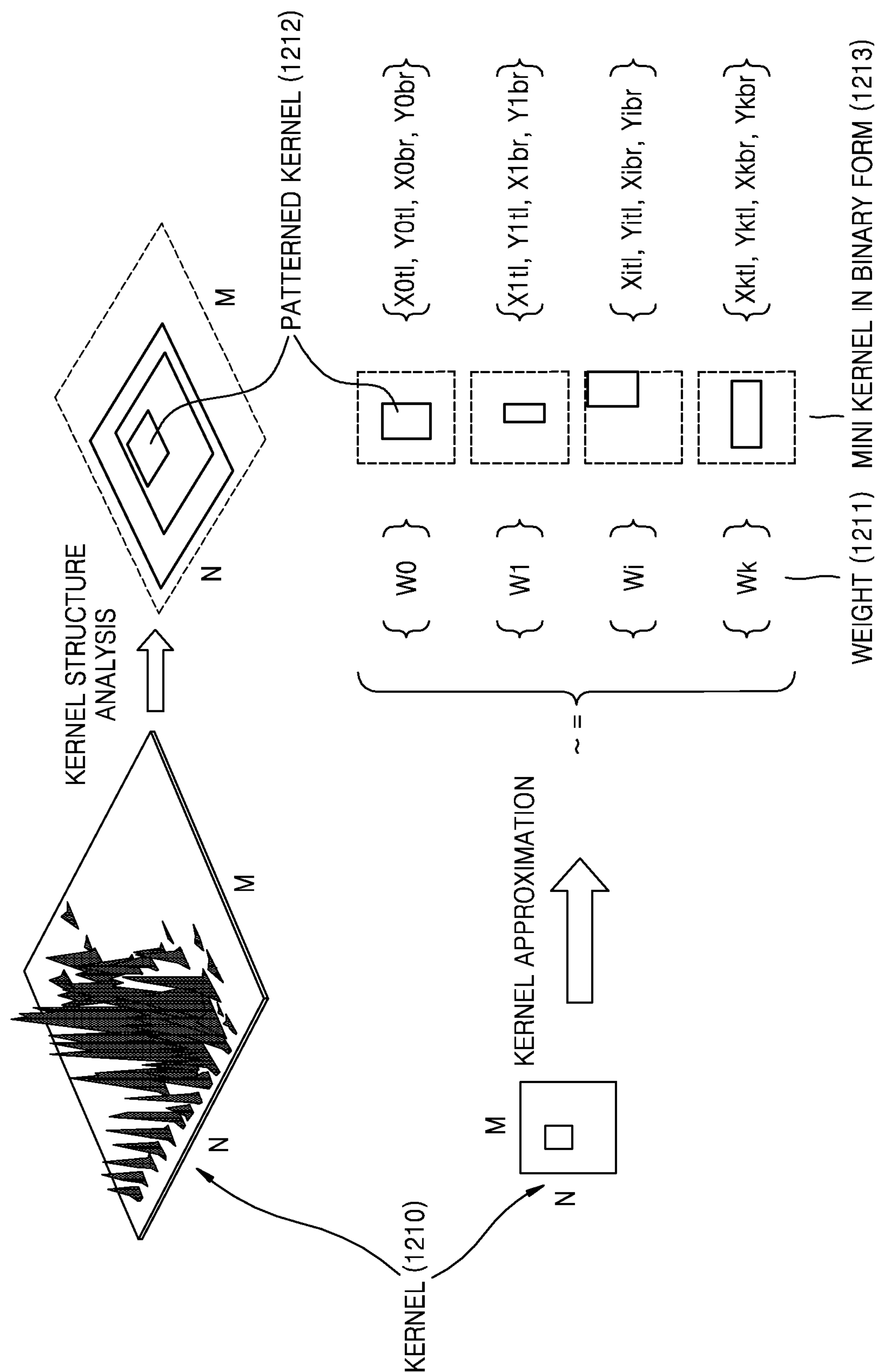
FIGS. 12 and 13 illustrate, via schematic diagrams, aspects of kernel approximation according to certain embodiments of this disclosure.
Figure 13:
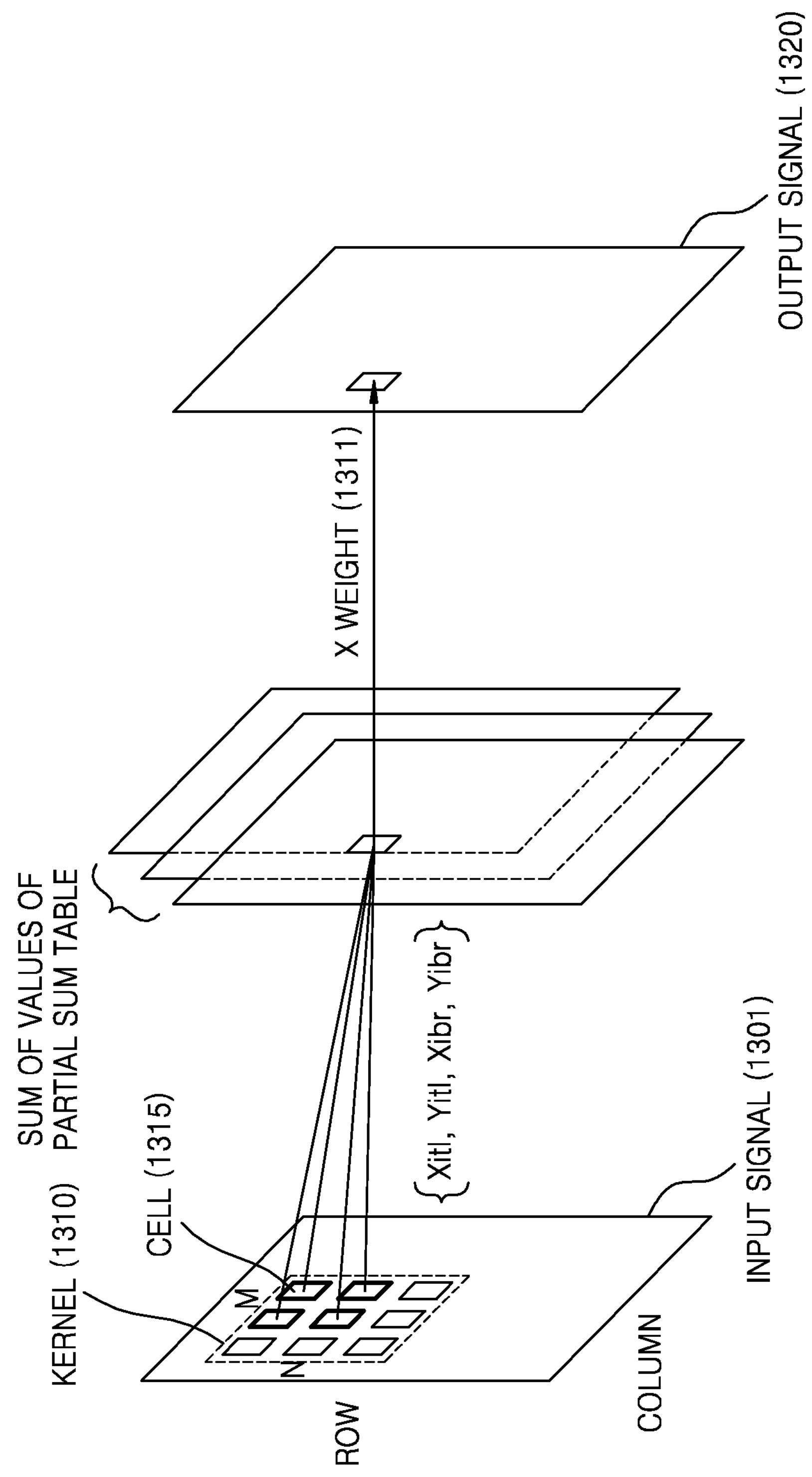

FIGS. 12 and 13 illustrate aspects of kernel approximation according to some embodiments of the present disclosure.

According to some embodiments, a device may analyze and approximate a structure of a kernel 1210. The kernel 1210 shown in the non-limiting example of FIG. 12 is a kernel having a size of N×M, and a kernel having a structure in which a value exists in only a part of the kernel.

According to some embodiments, the device may approximate a pattern by analyzing the structure of the kernel 1210, thereby dividing a type of the pattern and a kernel 121 of the pattern into a weight 1211 and a patterned kernel 1212. For reference, a remaining kernel excluding a weight from a mini kernel may be referred to as a mini kernel 1213 in binary form. In other words, the mini kernel 1213 in binary form means a kernel in binary form consisting only of 0 and 1 by excluding the weight from the mini kernel.

FIG. 13 illustrates aspects of the non-limiting example of kernel approximation shown in FIG. 12 in a different way. When applying a predetermined kernel 1310 to an input signal 1301, a processed output signal 1320 may be obtained by summing values of cells in an array in a partial sum table corresponding to respective cells 1315 of a region in the kernel 1310 and multiplying the summed value by a weight.

Figure 14:
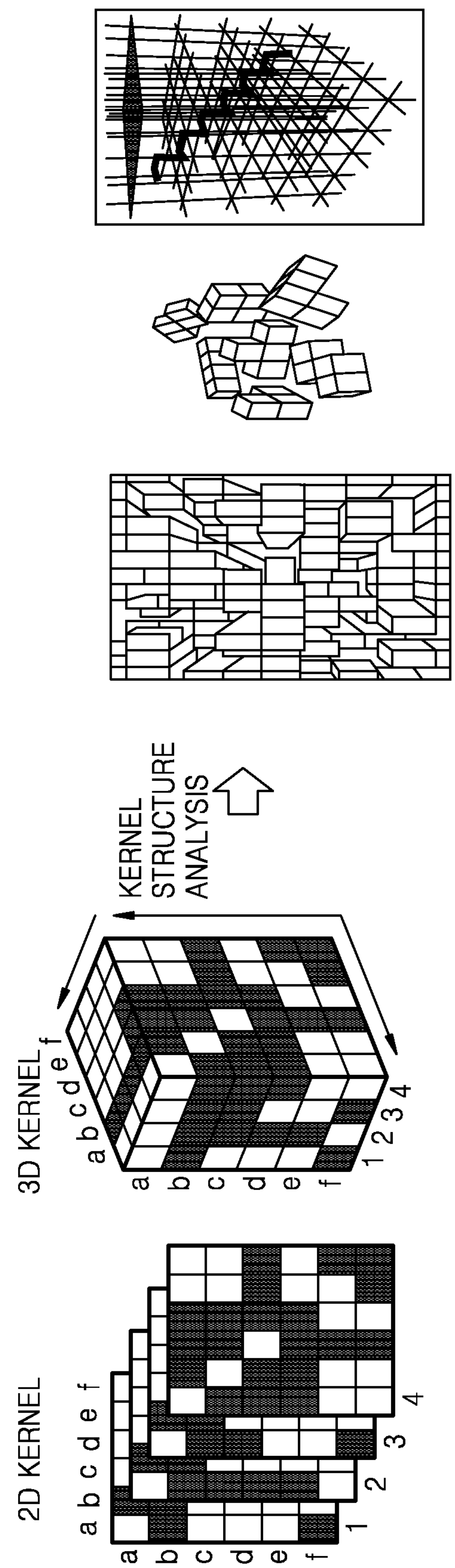
FIG. 14 illustrates aspects of an approximation of a 3-dimensional (3D) kernel according to certain embodiments of the present disclosure.

FIG. 14 illustrates aspects of approximating a 3-dimensional (3D) kernel according to some embodiments of the present disclosure. Although an example is given only for a 2-dimensional (2D) kernel above, the 3D kernel may also be approximated in the same method as described in FIGS. 1 to 13.

According to some embodiments, the device may analyze a structure of the 3D kernel. A pattern type and a pattern location may be determined by analyzing the structure of the 3D kernel. That is, as described above, the device may determine an optimal pattern type and pattern location with the smallest error among combinations of pattern types and locations that a kernel may have and divide the kernel based on determination.

Also, according to some embodiments, the device may group a plurality of 2D kernels into one 3D kernel and then approximate the 3D kernel.

Figure 15:
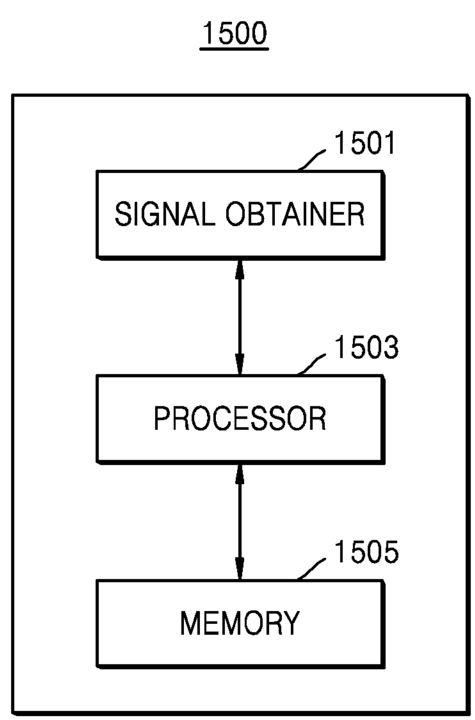
FIG. 15 illustrates, in block diagram format, a device for processing a multimedia signal according to certain embodiments of the present disclosure.

FIG. 15 illustrates, in block diagram format, a device 1500 for processing a multimedia signal according to some embodiments of the present disclosure.

As shown in FIG. 15, the device 1500 for processing the multimedia signal according to some embodiments may include a signal obtainer 1501, a processor 1503, and a memory 1505. However, all components shown in FIG. 15 are not necessarily essential components of the device 1500 for processing the multimedia signal. The device 1500 for processing the multimedia signal may be implemented by more components than the components shown in FIG. 15 and the device 1500 for processing the multimedia signal may be implemented by fewer components than the components shown in the example of FIG. 15.

According to some embodiments, the signal obtainer 1501 may obtain the multimedia signal. The multimedia signal includes an image signal and an audio signal and is not limited to the above example. Also, according to some embodiments, the image signal may include at least one pixel.

According to some embodiments, the processor 1503 typically controls the overall operation of the device 1500 for processing the multimedia signal. For example, the processor 1503 may execute programs stored in the device 1500, thereby generally controlling the components included in the device 1500.

According to some embodiments, the processor 1503 may determine at least one kernel to be used for processing of the multimedia signal obtained by the signal obtainer 1501. Also, the processor 1503 may approximate a kernel according to a structure of the obtained kernel and may process the multimedia signal obtained using the approximated kernel.

According to some embodiments, processing of a multimedia signal may refer to an operation of applying a kernel to the multimedia signal and applying of a kernel to a multimedia signal means performing an operation using the multimedia signal and the kernel. Also, according to some embodiments, approximation of a kernel may include a configuration for dividing the kernel into at least one mini kernel according to a structure of the obtained kernel.

According to some embodiments, the processor 1503 may determine a pattern type and a pattern location inside the obtained kernel based on a spatial connectivity in the obtained kernel. The processor 1503 may also divide the kernel obtained by determining the pattern type and the pattern location inside the obtained kernel into at least one mini kernel.

Also, according to some embodiments, the processor 1503 may convert each of the divided at least one mini kernel into a patterned kernel and a weight. The processor 1503 may apply each patterned kernel and weight to the multimedia signal and sum result values in which each patterned kernel and weight are applied.

According to some embodiments, the processor 1503 may generate a partial sum table including a plurality of resulting arrays in which each of at least one pattern type that the kernel may include is applied to the obtained multimedia signal. The processor 1503 may also select the plurality of resulting arrays in the partial sum table based on a pattern type of a patterned kernel and perform processing based on the selected plurality of resulting arrays.

Also, according to some embodiments, the processor 1503 may apply a weight corresponding to each patterned kernel to each of the selected arrays and sum the plurality of arrays to which the weight is applied. The processor 1503 may also select values of some or all of the selected plurality of arrays based on the pattern location in the divided at least one kernel. For example, the processor 1503 may select some regions and all regions in the plurality of arrays and use only values of cells in the selected regions.

According to some embodiments, the processor 1503 may extract a feature from the processed multimedia signal. For example, the processor 1503 may generate a feature map based on the processed multimedia signal, or may perform a predetermined determination. Also, the kernel may be determined based on the feature to be extracted from the multimedia signal.

Also, according to some embodiments, the processor 1503 may determine the pattern type and the pattern location such that a difference between a sum of the obtained kernel and the mini kernels is minimized. As described above, since the obtained kernel may include a plurality of pattern types, the processor 1503 may divide the obtained kernel such that a difference between the obtained kernel and an approximated kernel (for example, a sum of mini kernels) is minimized.

According to some embodiments, the processor 1503 may use an additional kernel to perform additional processing on the processed multimedia signal. That is, the processor 1503 may perform processing and further process the output multimedia signal. The processor 1503 may also process the multimedia signal in parallel. For example, the processor 1503 may process the multimedia signal using a first kernel and processing of the multimedia signal using a second kernel in parallel.

According to some embodiments, the memory 1505 may store a program for controlling the signal obtainer 1501 or the processor 1503, and may store data input to or output from the device 1500. Also, according to some embodiments, the memory 1505 may store a partial sum table generated by the processor 1503. Also, the signal obtainer 1501 may obtain the multimedia signal from the data stored in the memory 1505.

Figure 16:
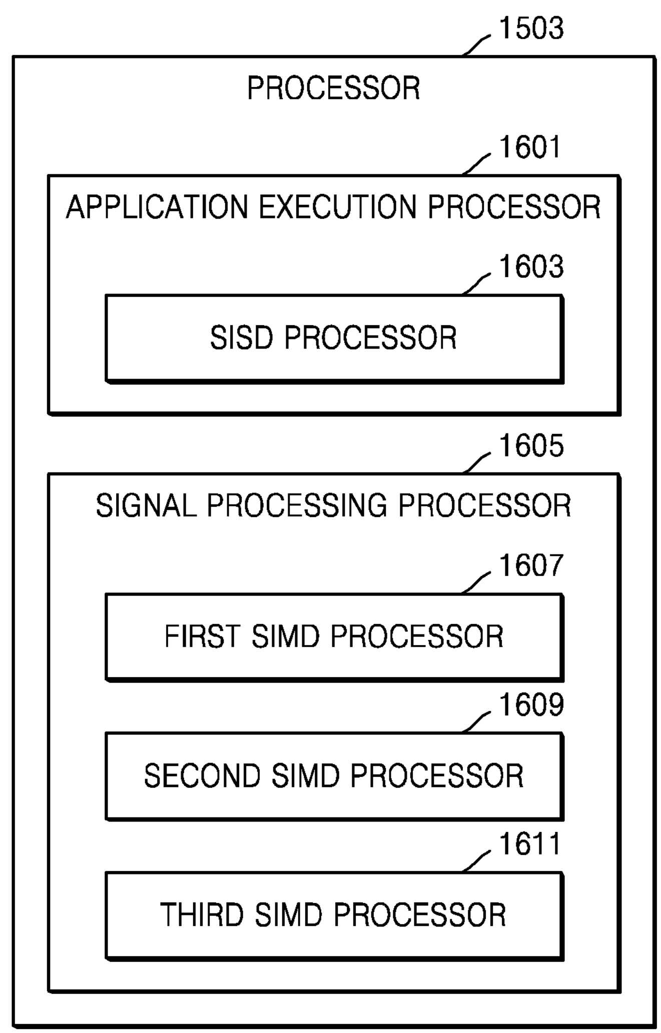
FIG. 16 illustrates, in block diagram format, a structure of a processor included in a device for processing a multimedia signal according to certain embodiments of the present disclosure.

FIG. 16 further illustrates aspects of the structure of a processor (such as processor 1503 shown in FIG. 15) included in a device for processing a multimedia signal according to some embodiments of the present disclosure.

As shown in FIG. 16, the processor 1503 may include an application execution processor 1601 and a signal processing processor 1605. However, all components shown in FIG. 16 are not essential components of the processor 1503. The processor 1503 may be implemented by more components than the components shown in FIG. 16, and the processor 1503 may be implemented by fewer components than components shown in FIG. 16.

According to some embodiments, the application execution processor 1601 may execute various applications. The application processor 1601 may execute applications and programs received from the memory 1505 or another storage or an external device.

Also, according to some embodiments, the application execution processor 1601 may include a single input single data (SISD) processor 1603. The SISD processor 1603 may include a processor capable of processing one piece of data in one instruction at a time. The application execution processor 1601 may include a plurality of SISD processors, may include at least one SIMD processor, and is not limited to the above example.

According to some embodiments, the signal processing processor 1605 may process the multimedia signal. That is, the signal processing processor 1605 may process the multimedia signal obtained using a kernel. The signal processing processor 1605 may also include a graphic processing unit (GPU).

Also, according to some embodiments, the signal processing processor 1605 may include a first single input multi data (SIMD) processor 1607, a second SIMD processor 1609, and a third SIMD processor 1611. A SIMD processor may include a processor capable of processing a plurality of pieces of data in one instruction. That is, the signal processing processor 1605 may process the multimedia signal in parallel. Also, the number of SIMD processors that the signal processing processor 1605 may include is not limited and may include at least one SISD processor. The signal processing processor 1605 is not limited to the above example.

Figure 17:
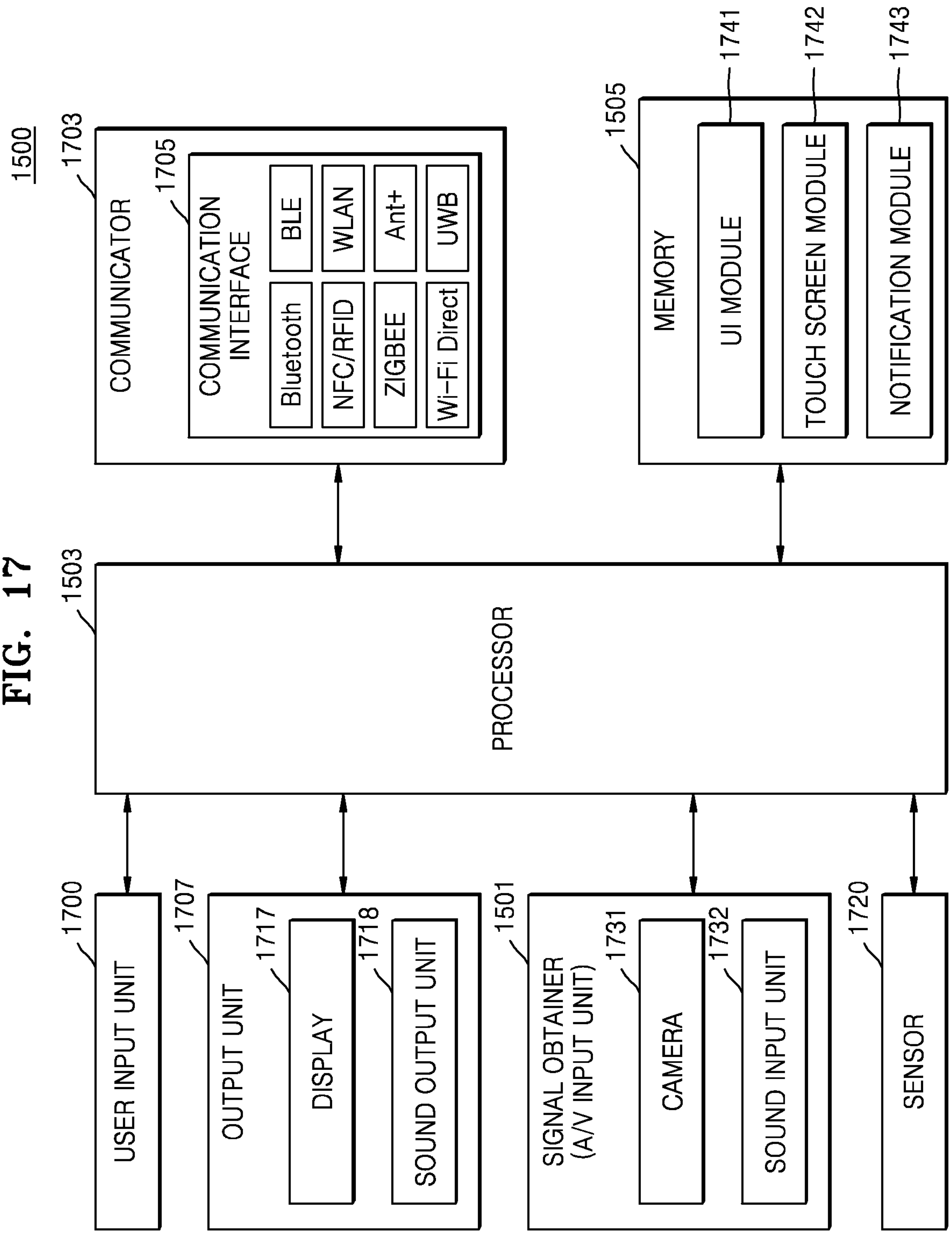
FIG. 17 illustrates, in block diagram format, a device for processing a multimedia signal according to certain embodiments of the present disclosure.

FIG. 17 illustrates, in block diagram format, a device 1500 for processing a multimedia signal according to some embodiments of the present disclosure.

As shown in FIG. 17, the device 1500 for processing the multimedia signal according to some embodiments may include a user input unit 1700, a communicator 1730, and an output unit 1710, in addition to the signal obtainer 1501, the processor 1503, and the memory 1505. However, all the components shown in FIG. 17 are not essential components of the device 1500 for processing the multimedia signal. The device 1500 for processing the multimedia signal may be implemented by more components than the components shown in FIG. 17 and the device 1500 for processing the multimedia signal may be implemented by fewer components than the components shown in FIG. 17.

According to some embodiments, the signal obtainer 1501 may further include a camera 1731 and a sound input unit 1732. The camera 1731 may obtain an image signal such as a still image or a moving image through an image sensor. The image signal obtained through the image sensor may be processed through the processor 1503. The image signal obtained and processed by the camera 1731 may be stored in the memory 1505 or transmitted to the outside through the communicator 1703. At least one camera 1731 may be provided according to a configuration of the device 1500.

The sound input unit 1732 may receive an external sound signal. According to some embodiments, the sound input unit 1732 may be a microphone, and is not limited to the example described above. The sound input unit 1732 may receive a sound signal from an external device, a server, or a user. The sound signal obtained through the sound input unit 1732 may be processed through the processor 1503. The image signal obtained and processed by the camera 1731 may be stored in the memory 1505 or transmitted to the outside through the communicator 1703. The sound signal obtained and processed by the sound input unit 1732 may be stored in the memory 1505 or transmitted to the outside through the communicator 1703.

According to certain embodiments of the present disclosure, operation of the processor 1503 corresponds to that described above, and thus a detailed description thereof will be omitted.

The memory 1505 may include a storage medium of at least one type selected from a flash memory, a hard disk, a multimedia card type memory, a card type memory such as a secure digital (SD) or xD-Picture (xD) card memory, a random access memory (RAM), a static random access memory (SRAM), a read-only memory (ROM), an electrically erasable programmable read-only memory (EEPROM), a programmable read-only memory (PROM), a magnetic memory, a magnetic disc, and an optical disc.

According to some embodiments, programs stored in the memory 1505 may be classified into a plurality of modules according to their functions. For example, the programs may be classified into a UI module 1741, a touch screen module 1742, a notification module 1743, etc.

The UI module 1741 may provide a specialized UI, a GUI, and the like that are synchronized with the device 1500 for each application. The touch screen module 1742 may detect a touch gesture on a touch screen of a user and may transmit information about the touch gesture to the processor 1503. The touch screen module 1742 according to some embodiments may recognize and analyze a touch code. The touch screen module 1742 may be configured as separate hardware including a controller.

The notification module 1743 may generate a signal for notifying an occurrence of an event of the device 1500. Examples of the event occurred in the device 1500 include a key signal input, a notification, and the like. The notification module 1743 may output a notification signal in a video signal form through a display 1717 or may output a notification signal in an audio signal form through the sound output unit 1718. An operation performed by the memory 1505 corresponds to the description provided above, and thus a detailed description thereof will be omitted.

The user input unit 1700 means a means for the user to input data for controlling the device 1500. For example, the user input unit 1700 may include a key pad, a dome switch, a touch pad (a contact capacitance type, a pressure resistive type, an infrared ray detection type, a surface ultrasonic wave conduction type, an integral tension measurement type, a piezo effect type, etc.), a jog wheel, a jog switch, and the like, but is not limited thereto.

According to some embodiments, the user may enter an algorithm for kernel approximation into the device 1500 via the user input unit 1700. The user input unit 1700 may also receive information about which reference is used to perform kernel approximation from the user. For example, the user input unit 1700 may receive information about an acceptable error range from the user upon kernel approximation. Also, according to some embodiments, the user input 1700 may obtain information about a pattern type and a pattern location that may be references when dividing a kernel from the user.

The communicator 1703 may include one or more components that allow the device 1500 to communicate with an external device. For example, the communicator 1703 may include a communication interface 1705.

The communication interface 1705 may include a Bluetooth communication module, a Bluetooth low energy (BLE) communication module, a near field communication module, a WLAN communication module, a Zigbee communication module, an infrared data association ((IrDA) communication module, a WFD (Wi-Fi Direct) communication module, an UWB (ultra wideband) communication module, and the like but is not limited thereto. A function of each communication module may be intuitively deduced from the name by a person skilled in the art, and thus a detailed description will be omitted.

The output unit 1707 may output an audio signal or a video signal, and may also output a vibration signal. The output unit 1707 may include a display 1717 and a sound output unit 1718.

The display 1717 may display and output the signal processed by the device 1500. Meanwhile, when the display 1717 and the touch pad have a layer structure and are configured as a touch screen, the display 1717 may be used as an input device in addition to an output device. The display 1717 may include at least one of a liquid crystal display, a thin film transistor-liquid crystal display, an organic light-emitting diode, a flexible display, a three-dimensional display 3D display, and electrophoretic display. The device 1500 may include two or more displays 1717 according to an implementation of the device 1500. At this time, the two or more displays 1717 may be arranged to face each other using a hinge.

The sound output unit 1718 may output an audio signal received from the communicator 1703 or stored in the memory 6003 or a processed audio signal. Also, the sound output unit 1718 outputs a sound signal related to the function performed by the device 1500. The sound output unit 1718 may include a speaker, a buzzer, and the like, and is not limited to the above example.

Further, according to some embodiments, the output section 1707 may further include a vibration motor.

A sensor 1720 may sense a state of the device 1500 or a state around the device 1500 and may transmit sensed information to the processor 1503. Also, the sensor 1720 may obtain the multimedia signal together with the signal obtainer 1501 (an A/V input unit).

The sensor 1720 may include at least one of a magnetic sensor, an acceleration sensor, a temperature/humidity sensor, an infrared sensor, a gyroscope sensor, a position sensor (e.g., GPS), an air pressure sensor, and an illuminance sensor, but is not limited thereto. A function of each sensor may be intuitively deduced from the name by a person skilled in the art, and thus a detailed description thereof will be omitted.

The embodiments of the present disclosure provide a method of processing a multimedia signal with low power consumption and high memory usage efficiency.

The device according to certain embodiments of the present disclosure may include a processor, a memory for storing and executing program data, a permanent storage including a disk drive, a communication port for communication with an external device, a user interface device including a touch panel, a key, a button, and the like. The methods embodied as a software module or an algorithm may be stored as non-transitory computer-readable codes or program commands that are executable on the processor in a computer readable recording medium. The non-transitory computer-readable recording medium is any data storage device that may store data which may be thereafter read by a computer system. Examples of the non-transitory computer-readable recording medium include magnetic storage media (e.g., ROMs, RAMs, floppy disks, hard disks, etc) and optical reading media including CD-ROMs, DVDs, etc. The non-transitory computer-readable recording medium may also be distributed over network-coupled computer systems so that the computer-readable code is stored and executed in a distributed fashion. The media may be read by computers, may be stored in the memory, and may be executed on the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the disclosure, reference has been made to the exemplary embodiments illustrated in the drawings, and specific language has been used to describe these embodiments. However, no limitation of the scope of the disclosure is intended by this specific language, and the disclosure should be construed to encompass all embodiments that would normally occur to one of ordinary skill in the art.

The present disclosure may be described in terms of functional block components and various processing steps. Such functional blocks may be realized by any number of hardware and/or software components configured to perform the specified functions. For example, the present disclosure may employ various integrated circuit components, e.g., memory elements, processing elements, logic elements, look-up tables, and the like, which may carry out a variety of functions under the control of one or more microprocessors or other control devices. Similarly, where the elements of the present disclosure are implemented using software programming or software elements the disclosure may be implemented with any programming or scripting language such as C, C++, Java, assembler, or the like, with the various algorithms being implemented with any combination of data structures, objects, processes, routines or other programming elements. Furthermore, the present disclosure could employ any number of conventional techniques for electronics configuration, signal processing and/or data processing and the like. The words 'mechanism', 'element', 'means', and 'configuration may be used broadly and are not limited to mechanical or physical embodiments, but may include software routines in conjunction with processors, etc.

The particular implementations shown and described herein are illustrative examples of the disclosure and are not intended to otherwise limit the scope of the disclosure in any way. For the sake of brevity, conventional electronics, control systems, software development and other functional aspects of the systems (and components of the individual operating components of the systems) may not be described in detail. Furthermore, the connecting lines, or connectors shown in the various FIGS. presented are intended to represent exemplary functional relationships and/or physical or logical couplings between the various elements. It should be noted that many alternative or additional functional relationships, physical connections or logical connections may be present in a practical device. Moreover, no item or component is essential to the practice of the disclosure unless the element is specifically described as "essential" or "critical".

The use of the terms "a" and "an" and "the" and similar referents in the context of describing the disclosure (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein may be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. Numerous modifications and adaptations will be readily apparent to one of skilled in the art without departing from the spirit and scope of the present disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of processing a multimedia signal, the method comprising:

obtaining the multimedia signal;

determining at least one kernel to be used for processing the obtained multimedia signal;

determining a pattern type and a pattern location inside the at least one kernel based on a spatial connectivity in the at least one kernel, by minimizing a difference between the at least one kernel and a sum of at least one mini kernel, wherein the spatial connectivity includes information about a connection structure of patterns existing in the at least one kernel;

dividing the at least one kernel into at least one mini kernel based on the pattern type and the pattern location;

converting each of the at least one mini kernel into a patterned kernel and a weight;

applying each of the patterned kernel and the weight to the multimedia signal; and summing result values obtained by the application of each of the patterned kernel and the weight to the multimedia signal.

2. The method of claim 1, further comprising:

generating a partial sum table comprising a plurality of resulting arrays to which each of at least one pattern type that the at least one kernel comprise is applied to the obtained multimedia signal.

3. The method of claim 2, wherein the applying each of the patterned kernel and the weight to the multimedia signal comprises:

selecting the plurality of resulting arrays in the partial sum table based on the pattern type of the patterned kernel; and applying the weight corresponding to each of the patterned kernel to each of the selected plurality of resulting arrays.

4. The method of claim 3, wherein summing result values obtained by the applying each of the patterned kernel and the weight to the multimedia signal comprises:

summing the plurality of resulting arrays to which the weight is applied.

5. The method of claim 3, wherein the selecting of the plurality of resulting arrays in the partial sum table further comprises selecting values of some or all of the selected plurality of resulting arrays based on a pattern location in the at least one mini kernel.

6. The method of claim 1, further comprising:

extracting a feature from the multimedia signal, wherein the at least one kernel is determined based on the feature to be extracted from the multimedia signal.

7. The method of claim 4, further comprising:

additionally processing the multimedia signal using an additional kernel; and processing the obtained multimedia signal in parallel by using a kernel other than the at least one kernel.

8. A device for processing a multimedia signal, the device comprising:

a signal input interface implemented by a hardware processor configured to obtain the multimedia signal; and a processor configured to:

determine at least one kernel to be used for processing the obtained multimedia signal, determine a pattern type and a pattern location inside the at least one kernel based on a spatial connectivity in the at least one kernel, by minimizing a difference between the at least one kernel and a sum of at least one mini kernel, wherein the spatial connectivity includes information about a connection structure of patterns existing in the at least one kernel, divide the at least one kernel into at least one mini kernel based on the pattern type and the pattern location, convert each of the at least one mini kernel into a patterned kernel and a weight, apply each of the patterned kernel and the weight to the multimedia signal, and sum result values obtained by the application of each of the patterned kernel and the weight to the multimedia signal.

9. The device of claim 8, wherein the processor is further configured to generate a partial sum table comprising a plurality of resulting arrays to which each of at least one pattern type that the at least one kernel comprises is applied to the obtained multimedia signal.

10. The device of claim 9, wherein the processor is further configured to select the plurality of resulting arrays in the partial sum table based on the pattern type of the patterned kernel and apply the weight corresponding to each of the patterned kernel to each of the selected plurality of resulting arrays.

11. The device of claim 10, wherein the processor is further configured to sum the plurality of resulting arrays to which the weight is applied.

12. The device of claim 10, wherein the processor is further configured to select values of some or all of the selected plurality of resulting arrays based on a pattern location in the at least one mini kernel.

13. The device of claim 8, wherein the processor is further configured to extract a feature from the multimedia signal, wherein the at least one kernel is determined based on the feature to be extracted from the multimedia signal.

14. The device of claim 11, wherein the processor is further configured to perform additional processing on the multimedia signal by using an additional kernel and process the obtained multimedia signal in parallel using a kernel other than the at least one kernel.

15. A non-transitory computer-readable recording medium having recorded thereon a plurality of instructions that, when executed by one or more processors, is configured to cause the one or more processors to:

obtain a multimedia signal, determine at least one kernel to be used for processing the obtained multimedia signal, determine a pattern type and a pattern location inside the at least one kernel based on a spatial connectivity in the at least one kernel, by minimizing a difference between the at least one kernel and a sum of at least one mini kernel, wherein the spatial connectivity includes information about a connection structure of patterns existing in the at least one kernel, divide the at least one kernel into at least one mini kernel based on the pattern type and the pattern location, convert each of the at least one mini kernel into a patterned kernel and a weight, applying each of the patterned kernel and the weight to the multimedia signal, and summing result values obtained by the application of each of the patterned kernel and the weight to the multimedia signal.

* * * * *